United States Patent
Avadhanula et al.

(10) Patent No.: US 9,424,005 B1
(45) Date of Patent: Aug. 23, 2016

(54) TEMPLATIZED COMPONENT

(71) Applicant: The Mathworks, Inc., Natick, MA (US)

(72) Inventors: Srinath Avadhanula, Waltham, MA (US); Vijaya Raghavan, Brookline, MA (US); Michael D. Tocci, Medway, MA (US); John E. Ciolfi, Wellesley, MA (US); E. Mehran Mestchian, Newton, MA (US); Pieter J. Mosterman, Framingham, MA (US)

(73) Assignee: The Mathworks, Inc., Natick, MA (US)

( * ) Notice: Subject to any disclaimer, the term of this patent is extended or adjusted under 35 U.S.C. 154(b) by 160 days.

(21) Appl. No.: 13/837,910

(22) Filed: Mar. 15, 2013

Related U.S. Application Data

(63) Continuation-in-part of application No. 12/964,371, filed on Dec. 9, 2010, which is a continuation-in-part of application No. 13/478,344, filed on May 23, 2012.

(60) Provisional application No. 61/267,885, filed on Dec. 9, 2009.

(51) Int. Cl.
   *G06F 9/44* (2006.01)

(52) U.S. Cl.
   CPC ... *G06F 8/34* (2013.01); *G06F 8/35* (2013.01)

(58) Field of Classification Search
   CPC ........................................................ G06F 8/34
   USPC ................................ 717/105; 703/22; 700/31
   See application file for complete search history.

(56) References Cited

U.S. PATENT DOCUMENTS

| | | | |
|---|---|---|---|
| 5,699,507 A | 12/1997 | Goodnow, II et al. | |
| 7,124,406 B2 | 10/2006 | Ryu | |
| 7,275,237 B1* | 9/2007 | Schneider et al. | 717/108 |
| 7,324,931 B1 | 1/2008 | Warlock | |

(Continued)

FOREIGN PATENT DOCUMENTS

| | | |
|---|---|---|
| EP | 1662381 A1 | 5/2006 |
| JP | 3-80327 | 4/1991 |

(Continued)

OTHER PUBLICATIONS

Written Opinion for Application No. PCT/US2010/059716, dated Feb. 23, 2012.

(Continued)

*Primary Examiner* — Ryan Coyer

(74) *Attorney, Agent, or Firm* — Cesari and McKenna, LLP; Michael R. Reinemann

(57) ABSTRACT

A system and method provides top-down programming in a graphical programming environment. A developer may utilize a component constructor to create a graphical skeleton component that represents a template for a procedure. The graphical skeleton component may include one or more hole elements that mark locations in the component at which functions may be specified. An instance of the component may be included in a graphical model, and one or more functions specified for the hole elements, thereby completing the component. The one or more functions may refer to model parameters, and bindings may be captured among the parameters. Upon execution or simulation of the model, the one or more functions specified for the component are executed, and the parameters evaluated. The functionality of the completed may depend on the one or more functions specified for the hole elements.

32 Claims, 17 Drawing Sheets

(56) References Cited

U.S. PATENT DOCUMENTS

| | | | |
|---|---|---|---|
| 7,420,573 B1 | 9/2008 | Aberg | |
| 7,469,201 B2 | 12/2008 | Kiffmeier et al. | |
| 7,487,080 B1 | 2/2009 | Tocci et al. | |
| 7,502,031 B1 | 3/2009 | Pike et al. | |
| 7,681,151 B2 | 3/2010 | Ciolfi et al. | |
| 7,742,903 B2 | 6/2010 | Ciolfi et al. | |
| 7,756,686 B2 | 7/2010 | Kiffmeier et al. | |
| 7,774,172 B1* | 8/2010 | Yunt et al. | 717/125 |
| 7,809,545 B2 | 10/2010 | Ciolfi et al. | |
| 7,991,598 B1 | 8/2011 | Wood | |
| 8,046,751 B1 | 10/2011 | Avadhanula et al. | |
| 8,201,140 B2 | 6/2012 | Raghavan et al. | |
| 8,869,102 B2 | 10/2014 | Avadhanula | |
| 2002/0083413 A1 | 6/2002 | Kodosky et al. | |
| 2004/0153992 A1* | 8/2004 | Molina-Moreno et al. | 717/105 |
| 2006/0190105 A1 | 8/2006 | Hsu | |
| 2007/0074184 A1 | 3/2007 | Raghavan | |
| 2007/0106489 A1 | 5/2007 | Eryilmaz | |
| 2008/0263512 A1 | 10/2008 | Dellas et al. | |
| 2011/0137634 A1 | 6/2011 | Avadhanula et al. | |

FOREIGN PATENT DOCUMENTS

| | | |
|---|---|---|
| JP | 7-219759 | 8/1995 |
| JP | 8-241193 | 9/1996 |
| JP | 8-263299 | 10/1996 |
| JP | 11-85824 | 3/1999 |
| JP | 2001-125793 | 5/2001 |
| JP | 2004-502234 | 1/2004 |
| JP | 2005-122452 | 5/2005 |
| JP | 2006-92161 | 4/2006 |
| JP | 2006-351023 | 12/2006 |
| WO | WO 2007/027622 A2 | 3/2007 |

OTHER PUBLICATIONS

Nejati, Shiva et al., "Matching and Merging of Statecharts Specifications", 29th International Conference on Software Engineering (ICSE'07), pp. 54-64 (2007).
Sane, Aamod et al., "Object-Oriented State Machines: Subclassing, Composition, Delegation, and Genericity," ACM Sigplan Notices, vol. 30(10): 17-32 (1995).
International Search Report and Written Opinion for Application No. PCT/US2010/059716, dated Mar. 31, 2011.
"Model Reference Variants," The MathWorks, Inc., 2009, pp. 1-4.
"Component-Based Modeling with Model Reference," The MathWorks, Inc., 2010, pp. 1-4.
"A Model Checking Example: Solving Sudoku Using Simulink Design Verifier," Lockheed Martin Corporation, 2009, pp. 1-7.
"The Answer for Large Scale Modeling: Model Reference," Guy and Seth on Simulink, The Math Works, Inc., Dec. 5, 2008, pp. 1-7.
"Simulink Verification and Validation 3.0," The MathWorks, Inc., 2010, pp. 1-9.
"Simulink® 7: User's Gide," The MathWorks, Inc., Apr. 2011, pp. i-lviii, 1-1 to 1-46, 2-1 to 2-78, 3-1 to 3-138, 4-1 to 4-32, 5-1 to 5-84, 6-1 to 6-30, 7-1 to 7-38, 8-1 to 8-122, 9-1 to 9-34, 10-1 to 10-18, 11-1 to 11-46, 12-1 to 12-18, 13-1 to 13-82, 14-1 to 14-12, 15-1 to 15-10, 16-1 to 16-44, 17-1 to 17-36, 18-1 to 18-56, 19-1 to 19-22, 20-1 to 20-80, 21-1 to 21-60, 22-1 to 22-46, 23-1 to 23-26, 24-1 to 24-234, 25-1 to 21-70, 26-1 to 26-26, 27-1 to 27-88, 28-1 to 28-44. 29-1 to 29-98, 30-1 to 30-96, 31-1 to 31-28, 32-1 to 32-26, 33-1 to 33-32, A-1 to A-4, Index-1 to Index-22.
Toyoda, Masashi, et al., "Supporting Design Patterns in a Visual Parallel Data-flow Programming Environment," IEEE, 1997, p. 76-83.
Elrad, Tzilla, et al, "Discussion Aspects of AOP," Communications of the ACM, vol. 44, No. 10, Oct. 2001, pp. 33-38.
Fowler, Martin, "Lambda," Martin Fowler, <http://martinfowler.com/bliki/Lambda.html>, Sep. 8, 2004, pp. 1-4.
Gafter, Neal, "Neal Gafter's Blog: A Definition of Closures," <http://gafter.blogspot.com/2007/01/definition-of-closures.html >, Jan. 28, 2007, pp. 1-18.
"Libraries in Simulink," Guy and Seth on Simulink, The MathWorks, Inc., <http://blogs.mathworks.com/seth/2008/07/18/libraries-in-simulink/>, Jul. 18, 2008, pp. 1-11.
Pollice, Gary, "A Look at Aspect-Oriented Programming," IBM Corporation, <http://www.ibm.com/developerworks/rational/library/2782.html >, Feb. 17, 2004, pp. 1-7.
"Simulink User's Guide: R2012a," The MathWorks, Inc., Mar. 2012, pp. 1-2326.
Cesario, W., et al., "Component-based Design Approach for Multicore SoCs," Proceedings of the 39th Design Automation Conference, New Orleans, Louisiana, DAC 2002, Jun. 10-14, 2002, pp. 789-794.
"Embedded Systems and System on Chip," FPGAs for DSP19, Version 3, Xilinx, Oct. 30, 2007, pp. 1-104.
"Real-Time Workshop Embedded Coder: User's Guide Version 3," The MathWorks Inc, Oct. 2004, pp. 1-155.
"Simulink Design Verifier 2 User's Guide," The MathWorks Inc., Apr. 2011, pp. 1-470.
Arsenovski, Daniel, "Professional refactoring in Visual Basic," 2008, Wiley Publishing, Inc., pp. 229-235.
Banci, Michele, et al., "Statecharts composition to model topologically distributed applications," 2006, Journal of Integrated Design and Process Science, vol. 10, No. 1, pp. 1-15.
Bogdanov, Kirill et al., "Computing the structural difference between state-based models," 2009, 16th Working Conference on Reverse Engineering, pp. 177-186.
Ducasse, Stephane et al., "A language independent approach for detecting duplicated code," 1999, IEEE International Conference on Software Maintenance, ten pages.
European Office Action for Application No. 10798416.3, 7 pages, dated Apr. 23, 2013.
Fleurey, Franck, et al., "A generic approach for automatic model composition," 2008, MoDELS 2007 Workshops, Springer-Verlag, pp. 7-15.
Fowler, Martin, "Refactoring Improving the Design of Existing Code," 1999, Addison-Wesley, pp. 283-284.
Gomaa, Hassan, "Designing Software Prtoduct Lines with UML," 2005, Addison-Wesley, pp. 117-135.
Japanese Office Action for Application No. 2012-543283, 10 pages, dated Oct. 8, 2013.
Jiang, Lingxiao et al., "Deckard: Scalable and accurate tree-based detection of code clones," 2007, Proceedings of the 29th international conference on Software Engineering, ten pages.
Kelter , Udo et al. "Comparing state machines," 2008, Comparison and Versioning of Models 2008, pp. 1-6.
Kishi, Mihoko et at, "A program synthesis system based on state transition model," Research Report, The Information Processing SOCiety of Japan, vol. 91(66)1 67.174 (1991).
Leupers, Rainer, et al., "Function inlining under code size constraints for embedded processors," 1999, IEEE International Conference on Computer-Aided Design, pp. 253-256.
Oliveira, Kleinner S.F. et al., "A guidance for model composition," 2007, International Conference on Software Engineering Advances, six pages.
Pham, N.H. et al., "Complete and accurate clone detection in graph-based models," May 2009, IEEE 31st International Conference on Software Engineering, pp. 276-286.
Reddy, Raghu et al., "Model composition—a signature-based approach," 2005, Aspect Oriented Moeling Workshop at Models 20005, seven pages.
"Stateflow and Stateflow Coder," Version 5, 2003, The MathWorks, 896 pages.
Vijaykumar, N.L., et al., "Handling with parameterized states in Statecharts for determining performance measurements of reactive systems," 2001, Proceedings of the VII International Conference on Industrial Engineering and Operations Management, 13 pages.

* cited by examiner

TEMPLATIZED COMPONENT

CROSS-REFERENCE TO RELATED APPLICATIONS

The present application is a continuation-in-part of commonly assigned copending U.S. patent application Ser. No. 12/964,371, which was filed on Dec. 9, 2010, by Srinath Avadhanula and Vijay Raghavan for Canonicalized Versions of Reuse Candidates in Graphical State Diagrams, which claims priority to provisional patent application Ser. No. 61/267,885, filed Dec. 9, 2009, which applications are hereby incorporated by reference in their entireties.

The present application is also a continuation-in-part of commonly assigned copending U.S. patent application Ser. No. 13/478,344, which was filed on May 23, 2012, by Mojdeh Shakeri, Michael D. Tocci, John E. Ciolfi, E. Mehran Mestchian, and Pieter J. Mosterman for a Model Ring Component, which application is hereby incorporated by reference in its entirety.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
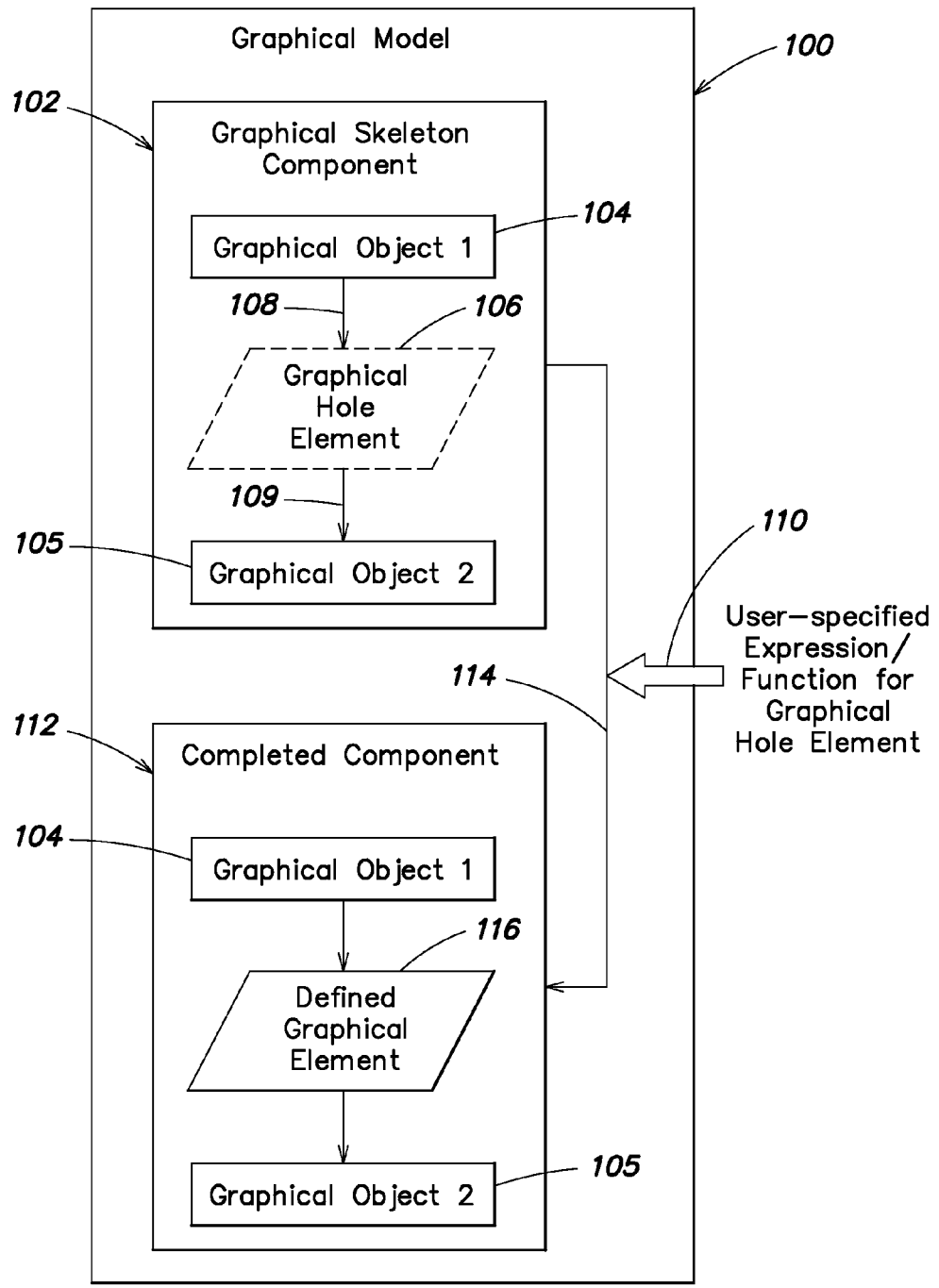
FIG. 1 is a schematic illustration of a graphical model in accordance with an embodiment of the invention.

In a graphical modeling system, a portion of a graphical model, such as a subchart or a subsystem, may be encapsulated as a component. The component may be saved in a library, and instances of the component may be copied to and used in other graphical models, or elsewhere in the same model. For a subsystem component, a logical workspace may be defined that contains variables that may only be readable and writable by model elements contained in the subsystem component. Such a subsystem component may be a masked subsystem component. When a masked subsystem component is opened, instead of seeing the contents of the subsystem component, a dialog may appear that 'masks' the contents of the subsystem component. The dialog may provide instructions for user interaction with the masked component. For a subchart component, which may use ports, a mapping table may be provided in order to map input values, output values, and parameters of the subchart component to values and variables defined in the graphical model into which an instance of the subchart is added. In addition, the instance of the component may be linked through a library link to the component saved in the library. Changes to the component saved in the library may be inherited by instances of the component through the library link. The structure and operation of the component, as saved in the library, may be fully defined and fixed, and every instance of the component implements that fixed structure and operation.

U.S. Patent Publication No. 2011/0137634 entitled Canonicalized Versions of Reuse Candidates in Graphical State Diagrams to Srinath Avadhanula and Vijay Raghavan describes a technique for designating multiple subcharts of a graphical state diagram as resuse candidates, and creating a canonicalized version of the reuse candidates. The canonicalized version of the reuse candidates has a generalized structure corresponding to the structure of the reuse candidates. For example, where the reuse candidates have particular states, child states, child transitions, and child junctions, the canonicalized version has placeholder states, placeholder child states, placeholder child transitions, and placeholder child junctions. Furthermore, one or more names, variables, and constants that appear in the reuse candidates may be replaced with canonicalized names, variables, and constants in the canonicalized version of the reuse candidate. The canonicalized version may be represented by an atomic statechart, and may replace the reuse candidates in the state diagram.

In a further embodiment, a canonicalized version may be created as a union of two reuse candidates that are non-identical. The union includes the structures defined by both reuse candidates. An instruction may be stored with the canonicalized version that indicates which of the particular structures to use depending on the reuse candidate being replaced with the canonicalized version.

An embodiment of the present invention relates to a system and method for creating graphical models having executable semantics. A graphical modeling environment may include a component constructor, a library, and a linking engine. The library may include a plurality of graphical objects that may be selected and used in the creation of a model. A developer may utilize the component constructor to create a graphical skeleton component. The graphical skeleton component may include a plurality of selected objects, and may define computational relationships among those objects, such as mathematical, e.g., signal-based, dataflow, control flow, event-based, state-based, mechanical, electrical, or other relationships or combinations of relationships.

The graphical skeleton component may constitute an abstract, e.g., a high-level, depiction of a procedure, operation, state machine, physical component, system, etc. The graphical skeleton component may include one or more holes that mark locations in the component at which one or more functions or expressions are to be evaluated or executed, but that do not specify any actual function or expression. The holes may be graphically represented in the skeleton component through one or more predetermined icons or symbols.

The graphical skeleton component thus defines a basic framework, e.g., a template, of a procedure, operation, state machine, physical component, or system. The full or complete specification of the component, however, is not defined. The developer may save the graphical skeleton component as a single entity in the library. In an embodiment, the graphical skeleton component may not execute due to the existence of the holes, and efforts to execute a model containing a graphical skeleton component may result in the generation of one or more errors. In another embodiment, the graphical skeleton component may define a base behavior allowing the graphical skeleton component to be used as is in a model, i.e., without specifying one or more functions and/or expressions for the holes.

A user may include an instance of the graphical skeleton component in a graphical model having executable semantics, such as a block diagram, a statechart, or a physics model, being created. For example, an instance of the graphical skeleton component as well as other graphical objects may be added to the graphical model being created, and relationships among the objects and the component may be specified. The user also may specify, e.g., define, one or more functions or expressions, and may assign these functions or expressions to the one or more holes of the graphical skeleton component. The assignment of functions or expressions to the holes of the graphical skeleton component converts the component into a completed component. The completed component may be executed as part of the execution of the graphical model. The assigned functions or expressions may be executed as integral parts of the completed component. That is, in an embodiment, the assigned functions or expressions are not separate, standalone functions or expressions that execute independently of the completed component by passing their results to the completed component.

FIG. 1 is a schematic illustration of a graphical model 100 as presented on a user interface, such as a display. The graphical model 100 includes a graphical skeleton component 102 having first and second graphical objects 104, 105 and a graphical hole element 106. The graphical skeleton component 102 includes arrows 108, 109 that define relationships among the graphical objects 104, 105 and the graphical hole element 106. A user working on the model 100 may specify one or more functions, instructions and/or expressions for the graphical hole element 106 of the graphical skeleton component 102, as indicated by arrow 110. In response, the graphical skeleton component 102 may be converted into a completed component 112, as indicated by arrow 114. The completed component 112 may include the first and second graphical objects 104, 105. However, the graphical hole element 106 may be replaced with a defined graphical element 116 based on the one or more functions, instructions and/or expressions specified by the user for the graphical hole element 106. With the graphical skeleton component 102 converted to a completed component 112, the graphical model 100 may now be successfully executed.

In an embodiment, the linking engine maintains a link between the completed component and the graphical skeleton component stored in the library. Changes to the graphical skeleton component may be detected by the linking engine and propagated automatically to every instance of the skeleton component, e.g., every completed component based upon the graphical skeleton component. The linking engine also may detect changes to completed components (other than the assignment of functions or expressions to holes), and may propagate such changes to the graphical skeleton component and to any other completed components linked to the graphical skeleton component.

The assignment of particular functions, instructions and/or expressions to the holes of the graphical skeleton component allows the user to fundamentally change the operation of the graphical skeleton component. Instances of the graphical skeleton component, i.e., completed components, may thus operate in fundamentally different and unique ways relative to each other, and yet all instances follow the basic framework, e.g., the template defined for the graphical skeleton component. The graphical skeleton component thus permits developers and users to create graphical models in a top-down manner, i.e., from generalized design to specific design.

Modeling Environment

Figure 2:
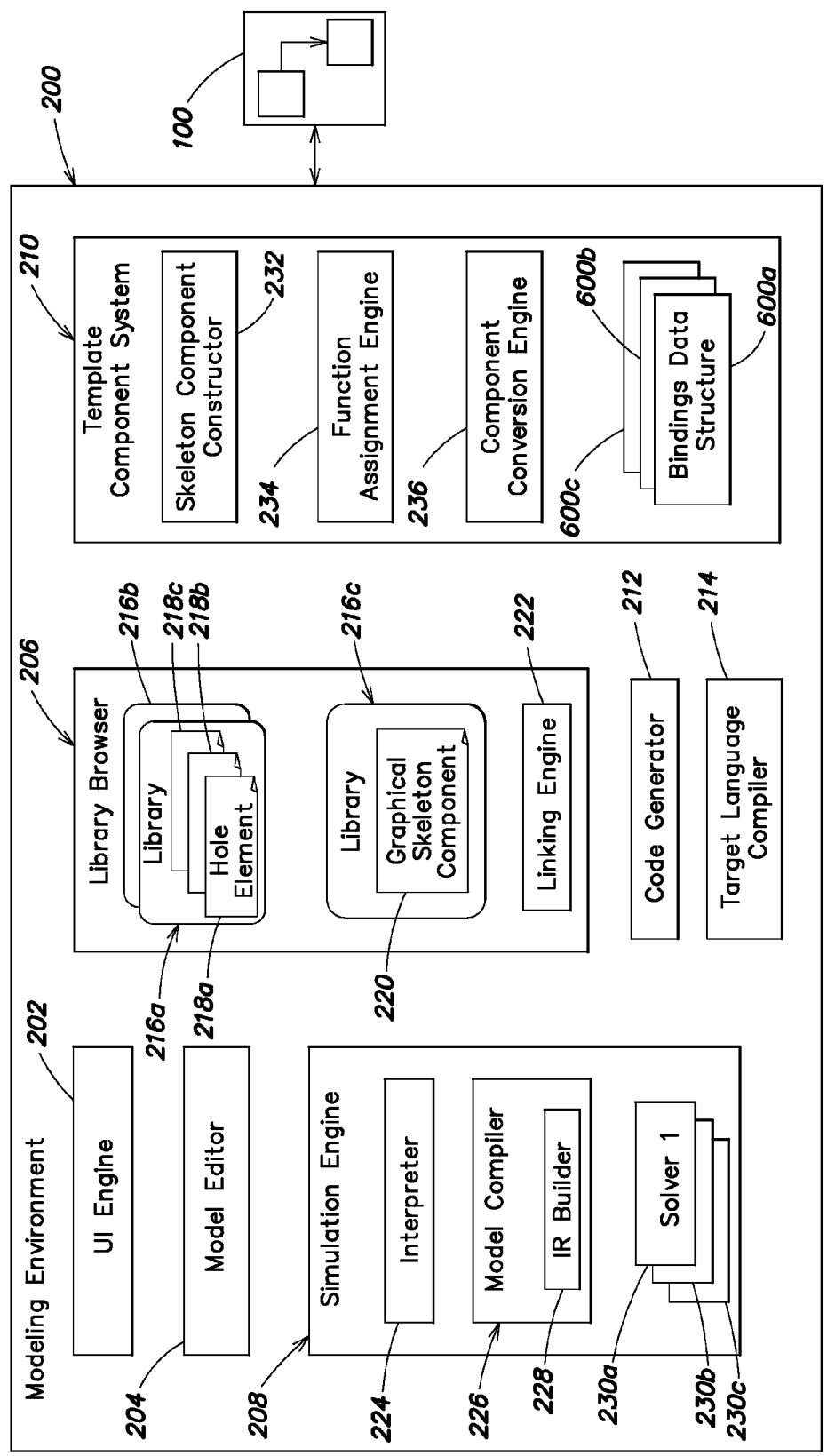
FIG. 2 is a partial functional block diagram of a modeling environment in accordance with an embodiment of the invention.

FIG. 2 is a partial, functional block diagram of a modeling environment 200 according to an embodiment of the invention. The modeling environment 200 may include a user interface (UI) engine 202, a model editor 204, a library browser 206, a simulation engine editor 208, a graphical template component system 210, a code generator 212, and a target language compiler 214. The modeling environment 200 may interact with the model 100.

The UI engine 202 may be configured to create a user interface, such as a Graphical User Interface (GUI) presented on a display, through which a designer or user may operate the modeling environment 200. The model editor 204 may be configured to perform operations on models, such as open, create, edit, save, and cut and paste operations, in response to user inputs through the GUI. The library browser 206 may include or have access to a plurality of libraries, such as libraries 216a-c. The libraries 216a-c may contain prototype graphical objects, and instances of these prototype objects may be selected by a user, and added to a model being developed. One or more of the libraries, such as libraries 216a, 216b may be built-in libraries of the modeling environment 200. That is, they may be predefined by the creator of the modeling environment 200, and be included with the modeling environment 200 upon installation, e.g., on a workstation. The built-in libraries 216a, 216b may include a plurality of built-in, e.g., predefined, graphical objects. Exemplary graphical objects include blocks and/or icons. The built-in libraries 216a, 216b also may include one or more sub-libraries. In an embodiment, at least one of the built-in libraries, e.g., library 216a, is configured to contain one or more hole elements, such as hole elements 218a-c. One or more of the libraries, such as library 216c, may be a user-created library. The user-created library 212c may contain one or more user-created objects, such as library blocks, subsystems, sub-charts, and sub-models, such as model reference blocks. In addition, the user-created library may include a graphical skeleton component 220.

The built-in and user-created blocks may represent programming entities, such as dynamic systems, computations, functions, operations, states, and physical components, for use in constructing models. At least some of the blocks may represent elementary programming entities, such as Gain, Add, Product, AND, EXCLUSIVE-OR, etc., which cannot be broken down any further. The hole elements 218a-c, however, may not have any predefined function or operation.

The library browser 206 also may include a linking engine 222. The linking engine 222 may be configured to establish a link between a prototype library block stored in a user-created library, such as library 216c, and each instance of that library block in a model. Changes to a prototype library block may be propagated to the instances of that library block by the linking engine 222. An instance of a library block as included in a particular model may be referred to as a reference block. The reference block is an instance of a library block, but the contents of the reference block may not be stored in the model. Instead, a dynamic library link may be stored in the model that links the reference block to its respective library block. The dynamic library link may be or at least may include a path to the respective library block.

The simulation engine 208 may be configured to execute, e.g., compile and run or interpret, models created or opened by a user of the modeling environment 200. The simulation engine 208 may include an interpreter 224, a model compiler 226 that, in turn, may include one or more Intermediate Representation (IR) builders, such as IR builder 228, and one or more of solvers, such as solvers 230a-c. Exemplary solvers include one or more fixed-step continuous solvers, which may utilize integration techniques based on Euler's Method or Heun's Method, and one or more variable-step solvers, which may be based on the Runge-Kutta and Dormand-Prince pair. A non-exhaustive description of suitable solvers may be found in the *Simulink 7 User's Guide* from The MathWorks, Inc. (March 2012 ed.), which is hereby incorporated by reference in its entirety.

The code generator 212 may be configured to generate computer programming code, such as source and/or object code, from a model. The target language compiler 214 may be configured to compile source code, such as source code generated by the code generator 212, into an executable form, such as one or more object code files or binaries, for execution by a particular processor, such as a central processing unit (CPU), an embedded processor, a microcontroller, etc. Suitable code generators for use with the present invention include, but are not limited to, the Simulink Coder, the Embedded Coder, and the Simulink HDL Coder products from The MathWorks, Inc. of Natick, Mass., and the TargetLink product from dSpace GmbH of Paderborn Germany. Suitable target language compilers include the xPC Target™ tool from The MathWorks, Inc., and a C language compiler. However, other code generation systems and other compilers may be used. HDL code, such as Verilog or very high speed integrated circuit hardware description language (VHDL), may be exported to one or more synthesis and layout tools for hardware realization, e.g., implementing the HDL code in selected target hardware, such as a Field Programmable Gate Array (FPGA) device. Suitable synthesis and layout tools include the ModelSim simulation and debug environment from Mentor Graphics Corp of Wilsonville, Oreg., and the Synplify family of synthesis tools from Synplicity, Inc. of Sunnyvale, Calif., among others.

The models may approximate operation of systems. Exemplary systems include physical systems, such as weather systems, financial markets, plants, controllers, etc.

The template component system 210 may include a skeleton component constructor 232, a function assignment engine 234, and a component conversion engine 236. In other embodiments, the template component system 210, or one or more components thereof, may be separate from the modeling environment 200. In that case, the template component system 210 may be in communication with the modeling environment 200, e.g., through local or remote procedure calls, or an Application Programming Interface (API). The template component system also may include one or more bindings data structures 600a-c.

In an embodiment, the modeling environment 200 is a high-level modeling environment. Suitable high-level modeling environments include the MATLAB® and Simulink® technical computing environments from The MathWorks, Inc., as well as the Simscape physical modeling system and the Stateflow charting tool also from The MathWorks, Inc., the MapleSim physical modeling and simulation tool from Waterloo Maple Inc. of Waterloo, Ontario, Canada, the LabVIEW programming system and the NI MatrixX model-based design product both from National Instruments Corp. of Austin, Tex., the Visual Engineering Environment (VEE) from Agilent Technologies, Inc. of Santa Clara, Calif., the System Studio model-based signal processing algorithm design and analysis tool from Synopsys, Inc. of Mountain View, Calif., the SPW signal processing algorithm tool from Synopsis, a Unified Modeling Language (UML) system, a Systems Modeling Language (SysML) system, the System Generator system from Xilinx, Inc. of San Jose, Calif., and the graphical modeling systems described in U.S. Pat. No. 7,324,931 for Conversion of Model Components Into References and U.S. Pat. No. 7,991,598 for Method and System for Modeling a Mechanical System, which are hereby incorporated by reference in their entireties, among others. Models created in the high-level modeling environment may contain less implementation detail, and thus operate at a higher level than certain programming languages, such as the C, C++, C#, and SystemC programming languages.

Those skilled in the art will understand that the MATLAB® technical computing environment is a math-oriented, textual programming environment for digital signal processing (DSP) design, among other uses. The Simulink® technical computing environment is a model-based design environment for modeling and simulating dynamic systems, among other uses. The MATLAB® and Simulink® tools provide a number of high-level features that facilitate algorithm development and exploration, and support model-based design. Exemplary high-level features include dynamic typing, array-based operations, data type inferencing, sample time inferencing, and execution order inferencing, among others.

It should be understood that the modeling environment 200 may include other and/or additional modules, such as a differencing engine that may be configured to identify the differences between two models.

In an embodiment, the template component system 210 as well as other components of the modeling environment 200 may be implemented through one or more software modules or libraries containing program instructions pertaining to the methods described herein. The software modules may be stored in memory, such as flash memory, and loaded into main memory of a workstation or other data processing machine, and executed by one or more processing elements. Other computer readable media may also be used to store and execute these program instructions, such as non-transitory computer readable media including optical, magnetic, or magneto-optical media. In another embodiment, the template component system 210 or portions thereof may comprise configured hardware elements, such as registers and combinational logic configured and arranged to produce sequential logic circuits. In alternative embodiments, various combinations of software and hardware, including firmware, may be utilized to implement the present invention.

The bindings data structures 600*a-c* may be implemented through files, lists, repositories, databases, etc., or other data structures. They may be stored in memory, such as a main memory of a workstation, persistent memory, and/or a computer readable medium.

Creation of a Graphical Skeleton Component

A designer may utilize the modeling environment 200 to create one or more graphical skeleton components, such as graphical skeleton component 102 and/or 220. That is, the user interface engine 202 may create an interface, such as a graphical user interface (GUI), which may be presented on a display. The GUI may include a model canvas, a toolbar, and a command bar, among other user interface elements, and may be operated by a component designer.

Figure 3:
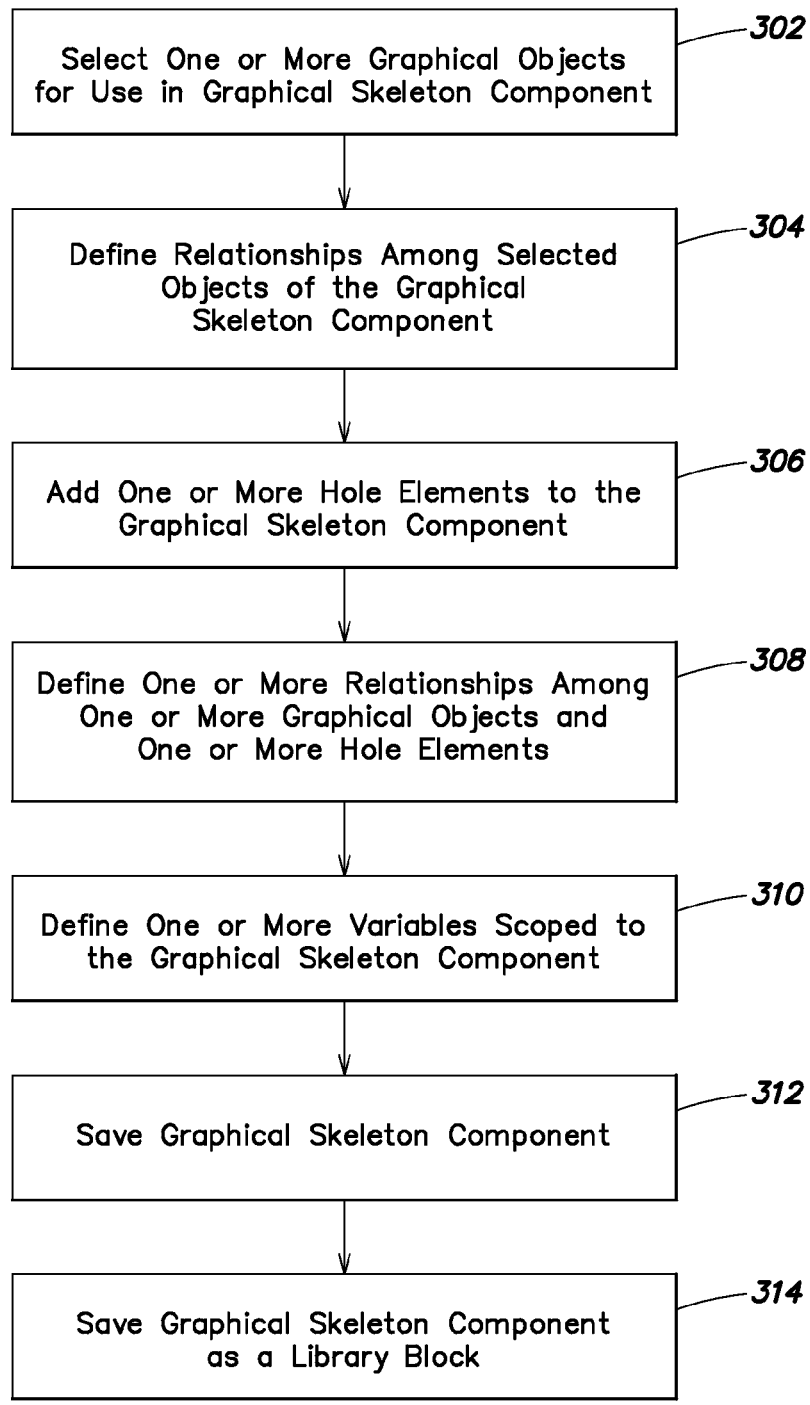
FIG. 3 is a flow diagram of a method in accordance with an embodiment of the invention.

FIG. 3 is a flow diagram of a method in accordance with an embodiment of the invention. A component designer, interacting with the GUI, may select one or more predefined graphical objects from one or more of the libraries 216*a-c*, and place copies of the selected graphical objects on the model canvas, as indicated at block 302. For example, a user may employ drag-and-drop, cut-and-paste, or other user interface techniques to select one or more graphical objects for inclusion in the graphical skeleton component. In response, the model editor 204 may construct instances of the selected objects, and include the instances in the graphical skeleton component being created. For example, the model editor 204 may create one or more data structures that represent the graphical skeleton component, and may include instances of the selected graphical objects in the data structures. The designer also may direct the model editor 204 to define relationships, such as computational relationships, among the selected graphical objects, as indicated at block 304. The designer may define the relationships graphically, for example by drawing lines, arrows or other symbols on the model canvas that connect selected graphical objects.

The designer also may direct the model editor 204 to add one or more hole elements to the graphical skeleton component 102, as indicated at block 306. For example, the user may select one or more of the prototype hole elements 218*a-c* from the built-in library 216*a*, and add instances of the selected hole elements to the graphical skeleton component. In an embodiment, the hole element may have a particular graphical representation that indicates it is a hole element, and distinguishes it from other objects, e.g., from non-hole objects. The particular graphical representation may vary depending on the domain of the hole element, such as a time-based modeling domain, a state-based modeling domain, a data and/or control flow modeling domain, etc. In an embodiment, a hole element may be a particular class of graphical element, such as a block or icon, supported by the modeling environment 200. Specifically, the hole element may be a prototype graphical object that implements one or more functions, and receives, as an input argument to the hole element, one or more other functions. A hole element also may be a portion of a graphical object. For example, in a state-based modeling domain, such as the Stateflow environment, a state transition may have two textual portions: a condition and an action. The condition portion of the state transition may be annotated as a hole element. The hole element also may receive one or more variables as input arguments, and, when executed, may produce one or more variables as output arguments. The one or more functions received by the hole element are executed as part of the execution of the hole element.

The designer may direct the model editor 204 to establish one or more relationships among the hole element and the graphical objects of the component, as indicated at block 308. For example, the hole element may be graphically connected to one or more graphical objects of the component in a similar manner as graphical objects are connected to each other.

The term function is intended to include one or more of expressions, conditions, actions, code snippets, programs, rules, modules, libraries, blocks of code, subroutines, statements, state diagrams, flow charts, and block diagrams. Furthermore, the term function is not intended to include merely input/output (I/O) data to a graphical skeleton component, or component parameters.

The graphical skeleton component may define or include one or more variables that are scoped to the graphical skeleton component 102, as indicated at block 310. The one or more variables may have variable names, and may have values, such as initial and/or default values. Furthermore, a first variable of the graphical template component 102 may be input to the hole element, e.g., from one or more graphical objects, and a second variable may be output by the hole element, e.g., to one or more graphical objects.

As noted, the hole element of the component may not define any particular function. Instead, the hole element may represent a placeholder within the graphical skeleton component, and a user of the component may specify one or more functions at the location of the hole element.

The designer may save the graphical skeleton component, as indicated at block 312. For example, the designer may save the graphical skeleton component in a memory of a data processing system, such as a persistent or a volatile memory unit of a workstation. In an embodiment, the designer may direct the model editor 204 to save the graphical skeleton component to a user library as a library block, as indicated at block 314.

The graphical skeleton component may provide a template of a procedure, but the template may not be fully specified due to the existence of the one or more hole elements in the component. That is, the template may specify an overall flow or procedure, but the details of the procedure remain undefined due to the existence of the one or more hole elements. The graphical skeleton component may specify an input/output (I/O) interface, thereby allowing the graphical skeleton component to be added to a model.

In an embodiment, the graphical skeleton component may be constructed in generally the same manner as a library object of the Simulink modeling environment.

Once saved, the graphical skeleton component may be used by the designer or by others in the construction and execution of graphical models.

Use of a Graphical Skeleton Component in a Model

Figure 4:
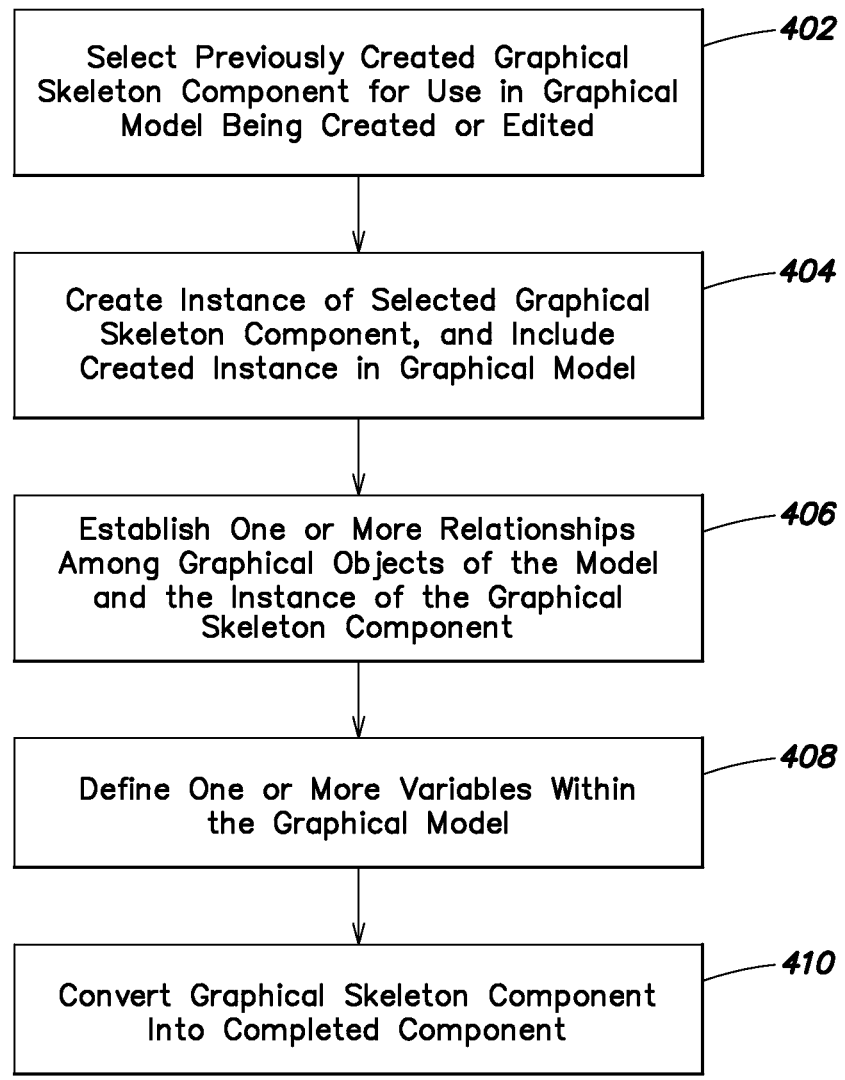
FIG. 4 is a flow diagram of a method in accordance with an embodiment of the invention.

FIG. 4 is a flow diagram of a method in accordance with an embodiment of the invention.

A user may select the previously created graphical skeleton component for inclusion in a model being created or edited by the user, as indicated at block 402. Again, the user may employ drag-and-drop, cut-and-paste or other GUI techniques. In response, the skeleton component constructor 232 may create an instance of the selected graphical skeleton component, and include it in the model under construction or development, as indicated at block 404. The user may establish relationships among one or more graphical objects of the model and the graphical skeleton component added to the model, as indicated at block 406. Exemplary relationships include computational relationships supported by the modeling environment 200. For example, in a time-based modeling environment, like the Simulink modeling environment, mathematical relationships may be established, e.g., by connecting graphical objects and the graphical skeleton component with arrow elements. In a dataflow modeling environments, dataflow relationships may be established. Relationships also may be defined textually in the graphical model. One or more variables may be defined within the model to which the graphical skeleton component is added, as indicated at block 408. The one or more variables may be defined outside of the graphical skeleton component, but within the model. The user may then convert the graphical skeleton component into a completed component, as indicated at block 410.

Figure 5:
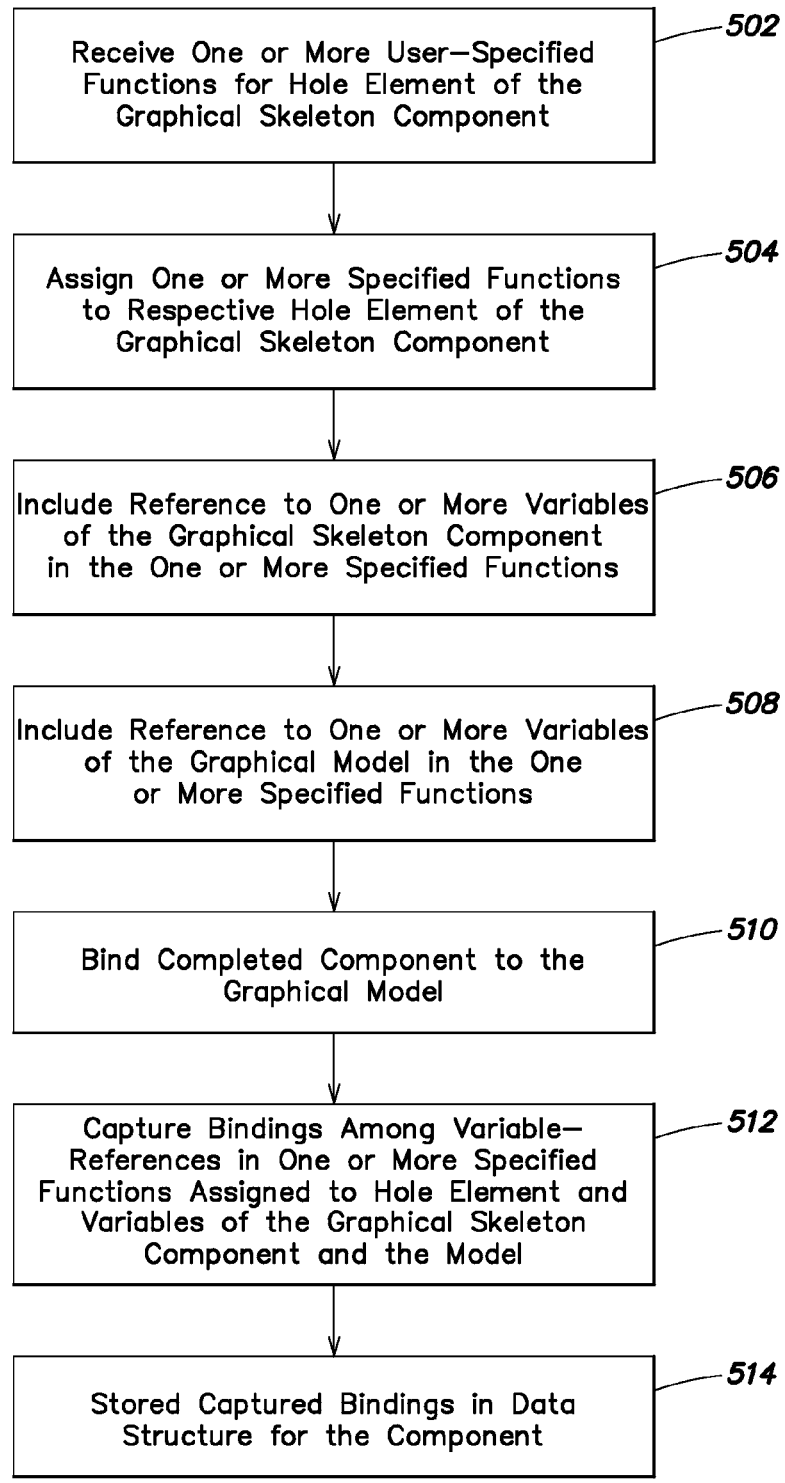
FIG. 5 is a flow diagram of a method in accordance with an embodiment of the invention.

FIG. 5 is a flow diagram of a method for completing a graphical skeleton component in accordance with an embodiment of the invention. The user may specify one or more functions to be passed as input arguments to the hole element of the graphical skeleton component, as indicated at block 502. In other words, the hole element may take as an input argument the one or more user-specified functions. The function assignment engine 234 may assign the one or more user-specified functions to the respective hole element, as indicated at block 504. The one or more functions may be defined graphically and/or textually by the user within the model in which the graphical skeleton component was added. In an embodiment, the one or more specified functions may appear to replace the hole element in the component. The one or more functions may include one or more references to one or more variables defined within the graphical skeleton component, as indicated at block 506. In addition, the one or more functions may include one or more references to one or more variables defined within the scope of the model in which the graphical skeleton component was added, as indicated at block 508.

The component conversion engine 236 may bind the completed component to the graphical model in which the graphical skeleton component was added, as indicated at block 510. In particular, the component conversion engine 236 may captures bindings between variables referenced in the one or more functions, and variables defined within the graphical model and in the graphical skeleton component, as indicated at block 512. The bindings may be captured in one or more data structures. For example, the conversion engine 236 may construct one or more bindings data structures 600 for storing the variable bindings and the assignment of functions and/or expressions, as indicated at block 514.

The bindings may establish relationships, such as assignments, between variables defined within the model and the component, and variables defined within the one or more functions specified for the respective hole element of the graphical skeleton component. In particular, certain variables of a component may be considered to be holes, which may be filled in using variables in the final, e.g., completed, model. More generally, some variables in the graphical skeleton component may be bound to more complicated expressions. For example, an output variable of a component 'y' may be bound to an expression, such as 'matrix[i]', in the completed model. Then, executing 'y=3' becomes equivalent to 'matrix[i]=3'.

In an embodiment, a graphical skeleton component may be configured to have its own logical workspace that is local to the skeleton component. Variables defined within this local, logical workspace may be available to elements included in the skeleton component, but may not be available to model elements located outside of the skeleton component. One or more of the variables defined within the local, logical workspace for the skeleton component may be bound to one or more variables defined in a workspace created for the model that contains the skeleton component. At least some of the variables defined within the local, logical workspace may be designated as capable of being bound to variables defined outside of the local, logical workspace, such as in the model workspace, or another workspace, such as a hosting application workspace. The simulation engine 208 may be configured to create and manage these different workspaces, each of which may have a particular scope. In addition, once a binding is established between a variable defined in the local, logical workspace for the graphical skeleton component, that binding may be maintained in other instances of the graphical skeleton component in the model.

In addition to having its own local, logical workspace, a graphical skeleton component may be configured as a masked graphical skeleton component. That is, the masked graphical skeleton component may be visually represented as a single block, and at least some of the elements of the masked graphical skeleton component may be hidden from the user. Upon opening a masked graphical skeleton component, instead of gaining access to the graphical objects of the graphical skeleton component for editing purposes, a dialog may be displayed that presents information, such as one or more of the variables defined within the local, logical workspace of the masked graphical skeleton component. A user may enter values into the dialog for selected variables. A user may also interface with the dialog to assign variables of the graphical skeleton component to variables defined in the model workspace, thereby establishing a binding between variables in the component's local workspace to variables in the model workspace.

Figure 6:
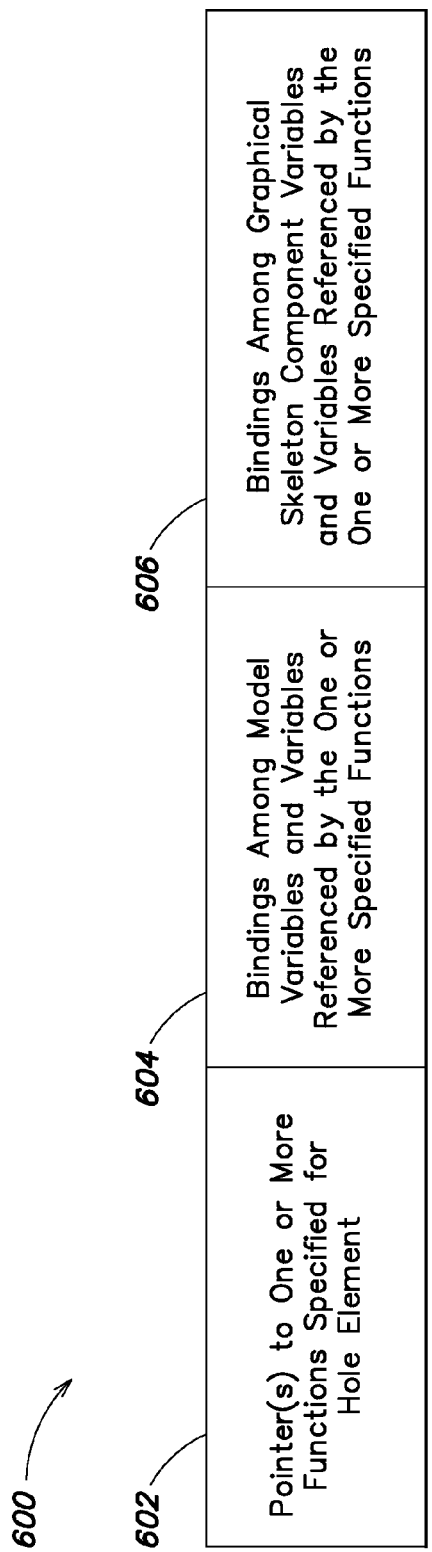
FIG. 6 is a schematic illustration of a data structure in accordance with an embodiment of the present invention.

FIG. 6 is a schematic illustration of an embodiment of the bindings data structure 600. The data structure 600 may include a plurality of fields configured to store data or information. More specifically, the bindings data structure 600 may include one or more pointer fields, such as pointer field 602, configured to store a pointer to each function specified, e.g., by the user, for the hole element. To the extent the graphical skeleton component has multiple hole elements, the data structure 600 may include additional pointer fields for storing pointers to the functions specified for the other hole elements. The data structure 600 may include one or more model variable bindings fields, such as model variable bindings field 604, configured to store bindings among variables of the model and variables referenced by the one or more specified functions. The data structure 600 may include one or more component variable bindings fields, such as component variable bindings field 606, configured to store bindings among variables of the graphical skeleton component and variables referenced by the one or more specified functions. The variable bindings fields 604, 606 may include the names, data types, and values of the variables, such as initial, default, and/or computed values. Alternatively, the values of the variables may be stored in one or more other fields of the data structure 600. It should be understood that the variable bindings fields 604, 606 may include other information concerning the variables, such as data dimensions, complexity, sample mode, sample times, etc.

In an embodiment, the template component system 210 may implement hole elements of graphical skeleton components using a programming language that supports closures, such as Lisp, Scheme, or SmallTalk. For example, the model compiler 226 and/or the code generator 212 may be configured to generate Lisp, Scheme, or SmallTalk code for a model that includes a graphical skeleton component. The model compiler 226 and/or code generator 212 may implement the hole elements through the closures features of those programming languages. In another embodiment, the template component system 210 may implement hole elements of graphical skeleton components using a programming language that supports anonymous functions, such as the Java programming language from Oracle Corp. of Redwood City, Calif., and the MATLAB language. The model compiler 226 and/or the code generator 212 may generate Java or MATLAB code for a model that includes a graphical skeleton component. The model compiler 226 and/or the code generator 212 may implement the hole elements through the anonymous functions features of those programming languages.

Alternatively, in a programming language such as C or C++, a main model and a hole element of a graphical skeleton component may be two threads that execute in lockstep and pass control back and forth to execute the logic. More specifically, the code generator 212 may generate such C or C++ code for the main model and hole element. In yet another embodiment, the code for a component may use a function pointer in the place of a hole element. The function pointer could be initialized by a main model with a function that contains the logic for the "hole fill". Accesses to data in the main model could be accomplished via global variables or by other registration mechanisms.

Model Execution

Figure 7:
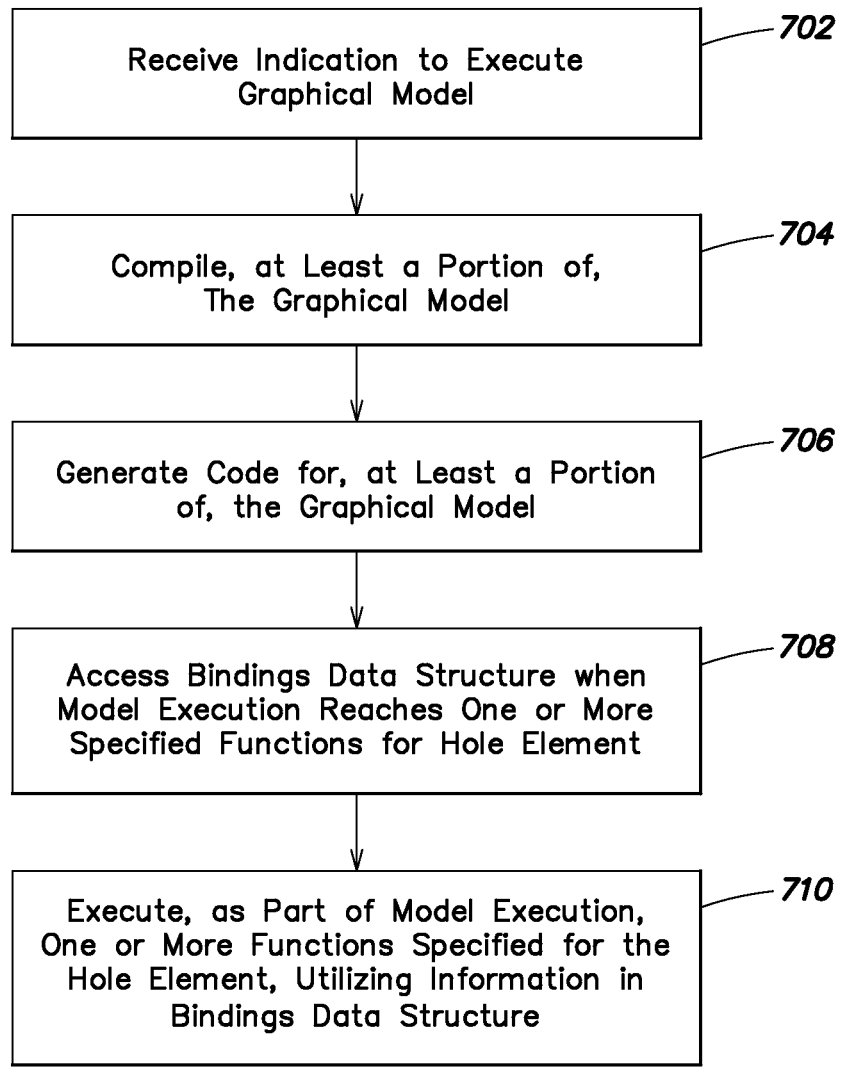
FIG. 7 is a flow diagram of a method in accordance with an embodiment of the invention.

The graphical model including the now completed component may be executed. FIG. 7 is a schematic illustration of a flow diagram of a method in accordance with an embodiment of the present invention. The simulation engine 208 may receive an indication, such as a command, to execute the graphical model, as indicated at block 702. In an embodiment, graphical model execution may be carried out over a time span, e.g., a simulation time having a start time and an end time, which may be user specified or machine specified. A compile stage may mark the start of execution of the model, as indicated at block 704, and may involve preparing data structures and evaluating parameters, configuring and propagating block characteristics, determining block connectivity, and performing block reduction and block insertion. The preparation of data structures and the evaluation of parameters may create and initialize one or more data structures used in the compile stage. For each of the blocks of the graphical model, a method may force the block to evaluate all of its parameters. This method may be called for all blocks in the model. If there are any unresolved parameters, execution errors may be thrown. During the configuration and propagation of block and port/signal characteristics, the compiled attributes (such as data dimensions, data types, complexity, sample modes, and sample time) of each block (and/or ports) may be setup on the basis of the corresponding behaviors and the attributes of blocks (and/or ports) that are connected to the given block through lines, e.g., arrows. The attribute setup may be performed through a process during which block behaviors "ripple through" the model from one block to the next following signal, dataflow, or other connectivity.

This process is referred to as "propagation." In the case of a block that has explicitly specified its block (or its ports') behaviors, propagation helps ensure that the attributes of the block are compatible with the attributes of the blocks connected to it. If not, an error may be issued. Secondly, in many cases, blocks are implemented to be compatible with a wide range of attributes. Such blocks may adapt their behavior in accordance with the attributes of the blocks connected to them. This is similar to the concept of polymorphism in object-oriented programming languages. The exact implementation of the block may be chosen on the basis of the model in which the block finds itself. Included within this step are other aspects such as validating that all rate-transitions yield deterministic results, and that the appropriate rate transition blocks are being used. The compilation step also may determine actual block connectivity. For example, virtual blocks may play no semantic role in the execution of a model. In this step, the virtual blocks may be optimized away, e.g., removed, and the remaining non-virtual blocks may be reconnected to each other appropriately. This compiled version of the model with actual block connections may be used from this point forward in the execution process. The way in which blocks are interconnected in the model does not necessarily define the order in which the equations (methods) corresponding to the individual blocks will be solved (executed). The actual order may be determined during the sorting step in compilation. In an embodiment, once the compilation step has completed, the sorted order may not be changed for the entire duration of the model's execution.

Following the compilation stage, code may or may not be generated for the model, as indicated at block 706. If code is generated, the model may be executed through an accelerated execution mode in which the model, or portions of it, is translated into either software modules or hardware descriptions, which is broadly referred to herein as code. If this stage is performed, then the stages that follow use the generated code during the execution of the model. If code is not generated, the model may execute in an interpretive mode in which the compiled and linked version of the model may be directly utilized to execute the model over the desired time-span. When users generate code for a model, they may choose to not proceed further with the model's execution. Instead, they may choose to take the code and deploy it outside of the confines of the modeling environment 200.

When execution of the graphical model reaches the one or more functions specified for a hole element, the assignment engine 234 may access the bindings data structure 600 for the respective hole element, as indicated at block 708. The template component system 210 may utilize the bindings data structure 600 to execute the one or more functions specified for the hole element, as indicated at block 710. For example, the template component system 210 may look-up the pointers from the field 602 to access the one or more specified functions, and access fields 604, 606 in order to read and write model and component variables by the one or more specified functions.

In an embodiment, the completed component, including the one or more functions specified for the hole element, may be executed as part of the execution of the model, as also indicated at block 710. That is, in an embodiment, the one or more functions are not executed as standalone code, whose output is then passed to the model.

Figure 8:
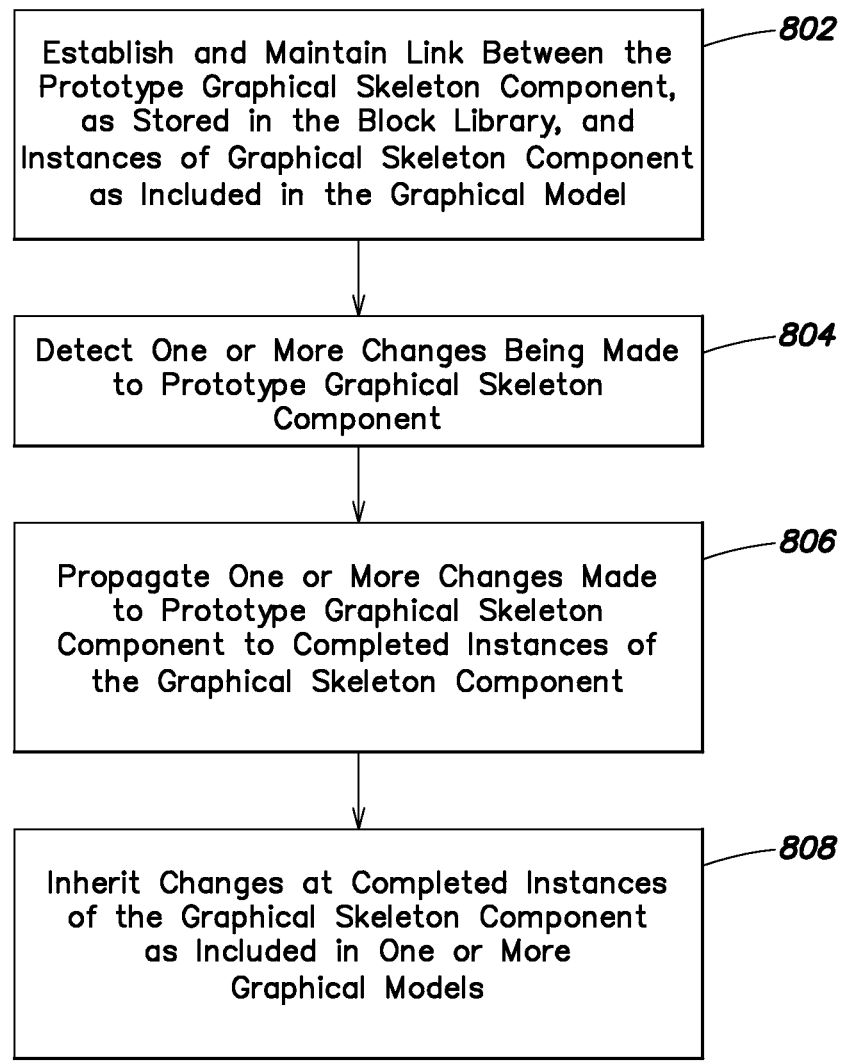
FIG. 8 is a flow diagram of a method in accordance with an embodiment of the invention.

FIG. 8 is a flow diagram of a method for linking components in accordance with an embodiment of the invention. The linking engine 222 may establish and maintain a dynamic link between the instance of the completed graphical skeleton component in the model and the graphical skeleton component saved as a library block, as indicated at block 802. The linking engine 222 may detect one or more changes being made to a prototype graphical skeleton component, e.g., by the creator of the component, as indicated at block 804. The linking engine 222 may propagate the one or more detected changes to the instances of the component included in graphical models, as indicated at block 806. The one or more propagated changes may be inherited by the instances of the components included in graphical models, as indicated at block 808. Accordingly, instances of a graphical skeleton component remain consistent with the prototype component saved in the user-created library 216*c*.

Figure 9:
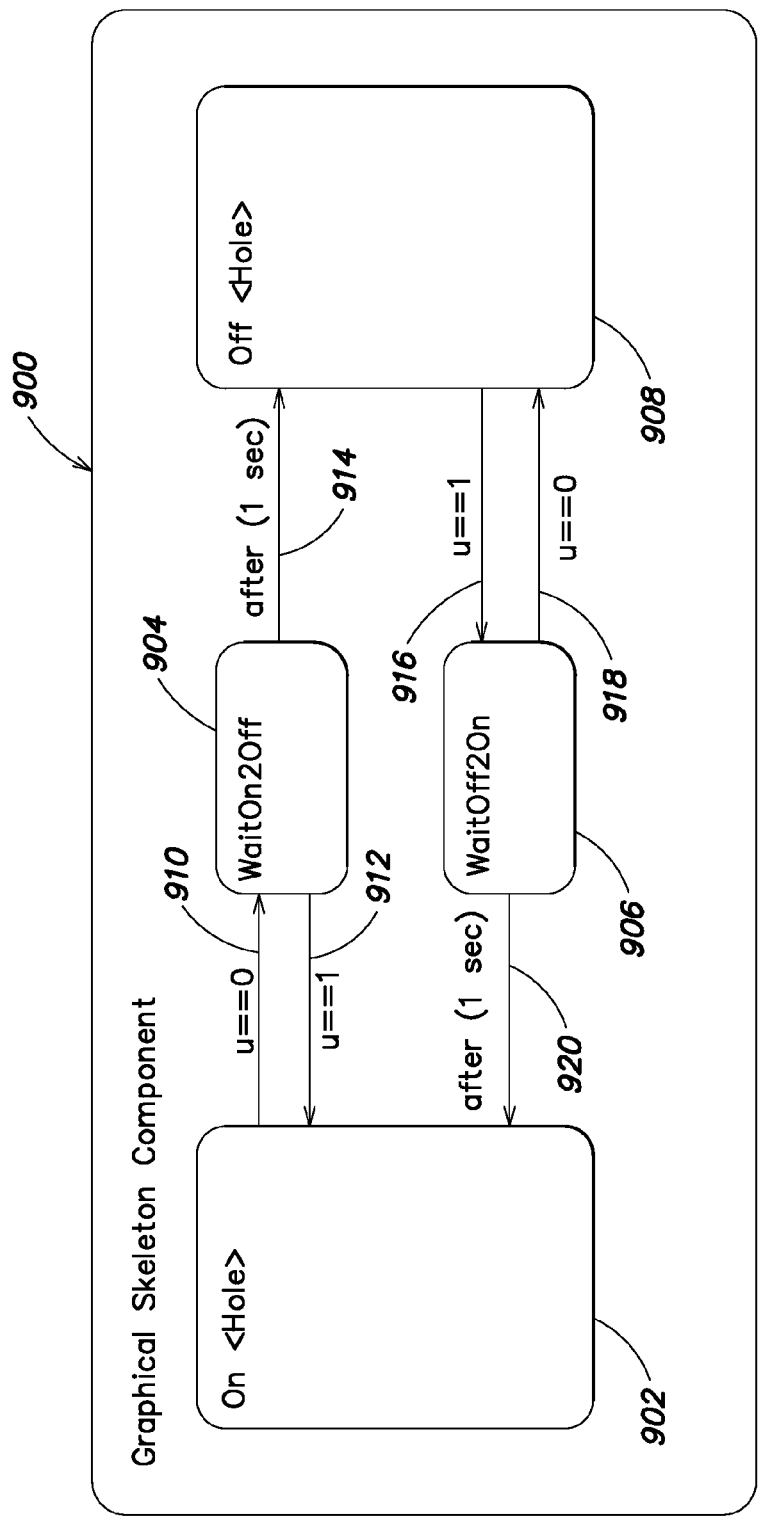
FIG. 9 is a schematic illustration of a graphical skeleton component in accordance with an embodiment of the present invention.

FIG. 9 is a schematic illustration of a graphical skeleton component 900 in accordance with an embodiment of the present invention. The component 900 may conform, at least in part, to a state-based modeling environment, such as the Stateflow modeling environment from The MathWorks, Inc. The component 900 may provide a template for a debouncer procedure. That is, the component 900 may transition to (or remain in) a first state when the value of an input signal 'u' is '1', and may transition to (or remain in) a second state when 'u' is '0'. However, the procedure only transitions to a different state when 'u' remains at the new value for more than one second. If the input signal 'u' moves to a new value but then returns to the original value in less than one second, no transition occurs.

The graphical skeleton component 900 may include a plurality of state blocks including an On state block 902, a WaitOn2Off state block 904, a WaitOff2On state block 906, and an Off state block 908. In addition, the component 900 may include a plurality of transitions among the states 902, 904, 906, 908, which may be represented graphically by arrows. Specifically, a first transition 910 transitions the system from the On state 902 to the WaitOn2Off state 904, when the value of the input signal 'u' becomes '0'. A second transition 912 moves from the WaitOn2Off state back to the On state 902 if 'u' returns to '1' after less than one second. If 'u' remains at '0' for more than one second, a third transition 914 transitions the system from the WaitOn2Off state 904 to the Off state 908. A fourth transition 916 moves from the Off state 908 to the WaitOff2On state 906, when 'u' goes from '0' to '1'. A fifth transition 918 moves from the WaitOff2On state 906 back to the Off state 908, if 'u' returns to '0' after less than one second. If 'u' remains at '1' for more than one second, a sixth transition 920 moves the system from the WaitOff2On state 906 to the On state 902.

The On state block 902 and Off state block 908 of the component 900 are implemented as hole elements. That is, the functions performed while the system is in the On state 902 and in the Off state 908 are not specified.

Once created, the graphical skeleton component 900 may be saved as a library block in a user-created library, such as library 216c. A user may select the graphical skeleton component 900 from the user-created library 216c and include one or more instances of it in a graphical model.

Figure 10:
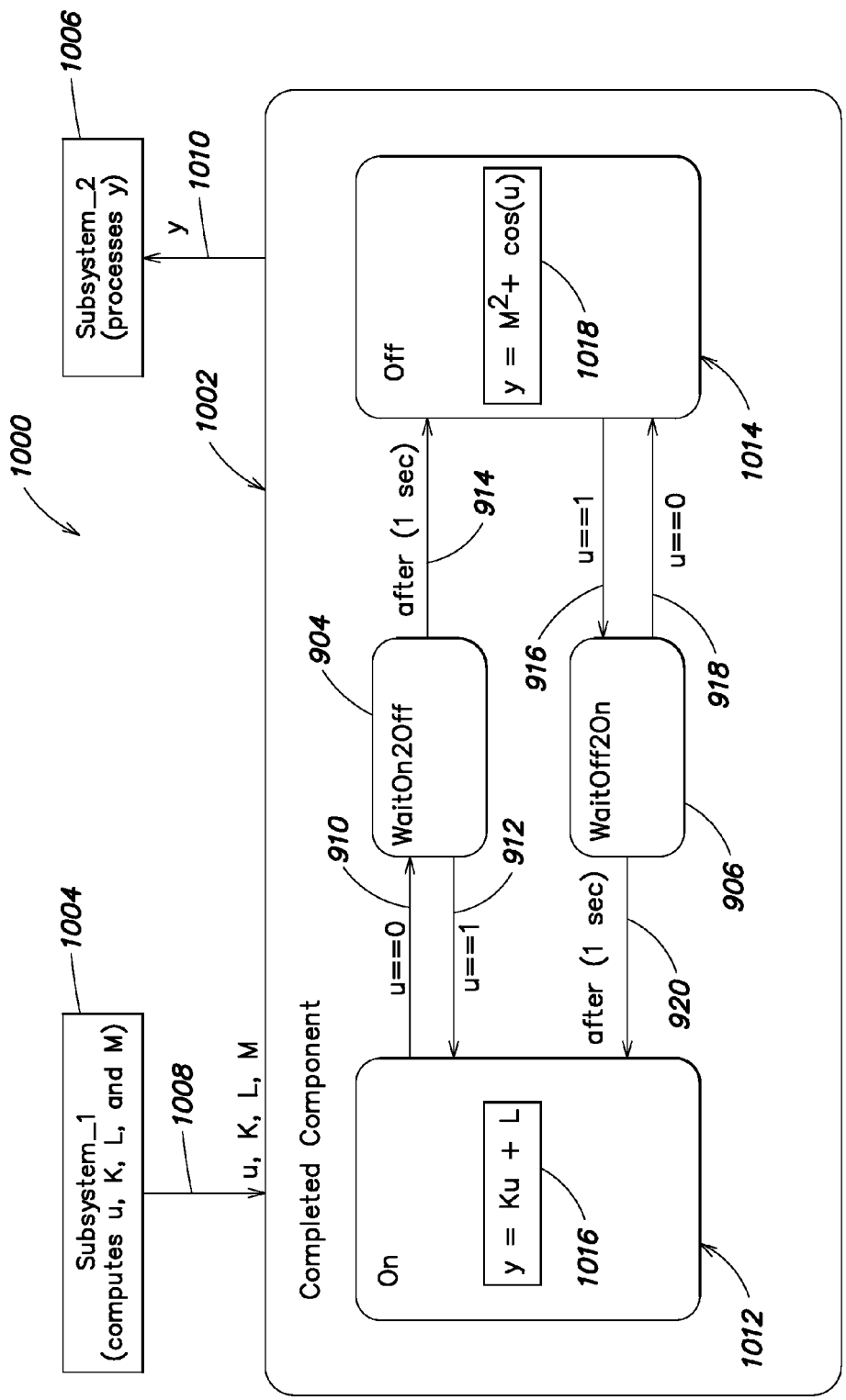
FIG. 10 is a schematic illustration of a graphical model including a completed version of the graphical skeleton component of FIG. 9.

FIG. 10 is a schematic illustration of a graphical model 1000 that includes an instance of the graphical skeleton component 900 as converted to a completed component 1002. The model 1000 also includes a first subsystem 1004 and a second subsystem 1006. The first subsystem 1004 may include a plurality of graphical objects (not shown) arranged to perform one or more procedures. The first subsystem 1004 also may generate one or more values for variables 'u', 'K', 'L', and 'M', where 'u' may be a time varying signal and 'K', 'L', and 'M' may be constants. A relationship may be defined to exist between the first subsystem 1004 and the completed component 1002, as indicated by arrow 1008. The second subsystem 1006 also may include a plurality of graphical objects (not show) arranged to perform one or more procedures. A relationship may be created between the second subsystem 1006 and the completed component 1002, as indicated by arrow 1010, and the second subsystem 1006 may utilize a variable 'y', where 'y' is a time varying signal.

The completed component 1002 may include a plurality of the same elements as the graphical skeleton component 900, e.g., the non-hole elements, such as the WaitOn2Off state 904, and the WaitOff2On state 906. For the hole elements 902, 908 of the graphical skeleton component 900, one or more functions may be specified thereby converting those elements to completed elements, e.g., completed On state 1012, and completed Off state 1014, respectively. For example, a first function 1016, 'y=Ku+L', may be specified, e.g., by the user, for the hole element 902, thereby converting the hole element 902 to the defined On state 1012 of the completed component 1002. The first function 1016 takes, as an input, the variable 'u', and generates an output variable 'y' by multiplying 'u' by 'K' and adding 'L'. A second function 1018, 'y=$M^2$+cos(u)', may be specified, e.g., by the user, for the hole element 908, thereby converting the hole element 908 to the completed Off state 1014. The second function 1018 also takes 'u' as an input variable, and generates 'y' as the square of 'M' plus the cosine of 'u'.

During execution of the model 1000, the variables 'u', 'K', 'L', and 'M' are computed by the first subsystem 1004. The variable 'u' may switch back and forth between '1' and '0'. While 'u' is '1', the completed component 1002 computes 'y' as 'Ku+L'. While 'u' is '0', the completed component 1002 computes 'y' as '$M^2$+cos(u)'. The second subsystem 1006 processes 'y' as computed by the completed component 1002.

The component conversion engine 236 may generate one or more bindings data structures 600 for the completed component 1002. The bindings data structures may include pointers to the user-specified functions 1016, 1018 for the hole elements, e.g., functions 'y=Ku+L' and 'y=$M^2$+cos(u)', which represent input arguments to the completed component 1002. The one or more bindings data structures 600 may also capture bindings among the variables 'u', 'y', 'K', 'L', and 'M'. Variables 'u', 'K', 'L', and 'M' are local to the graphical model 1000 and defined outside of the completed component 1002, while variable 'y' is defined by the completed component 1002 and utilized by another component of the model 1000, namely, the second subsystem 1006.

In an embodiment, the component conversion engine 236 may be configured to establish the bindings based on the names selected by the user for variables utilized in completing the graphical skeleton component. For example, to the extent the user completes the graphical skeleton component with functions using the variable names 'u', 'y', 'K', 'L' and 'M', and those same variable names are also defined in the model workspace, the component conversion engine 236 may establish bindings between the respective variables of the model workspace and the variables of the graphical skeleton component.

In another embodiment, the UI engine 202 may be configured to present one or more graphical affordances, such as dialog boxes, windows, panes, etc., having window elements through which a user may specify one or more desired bindings.

Figure 18:
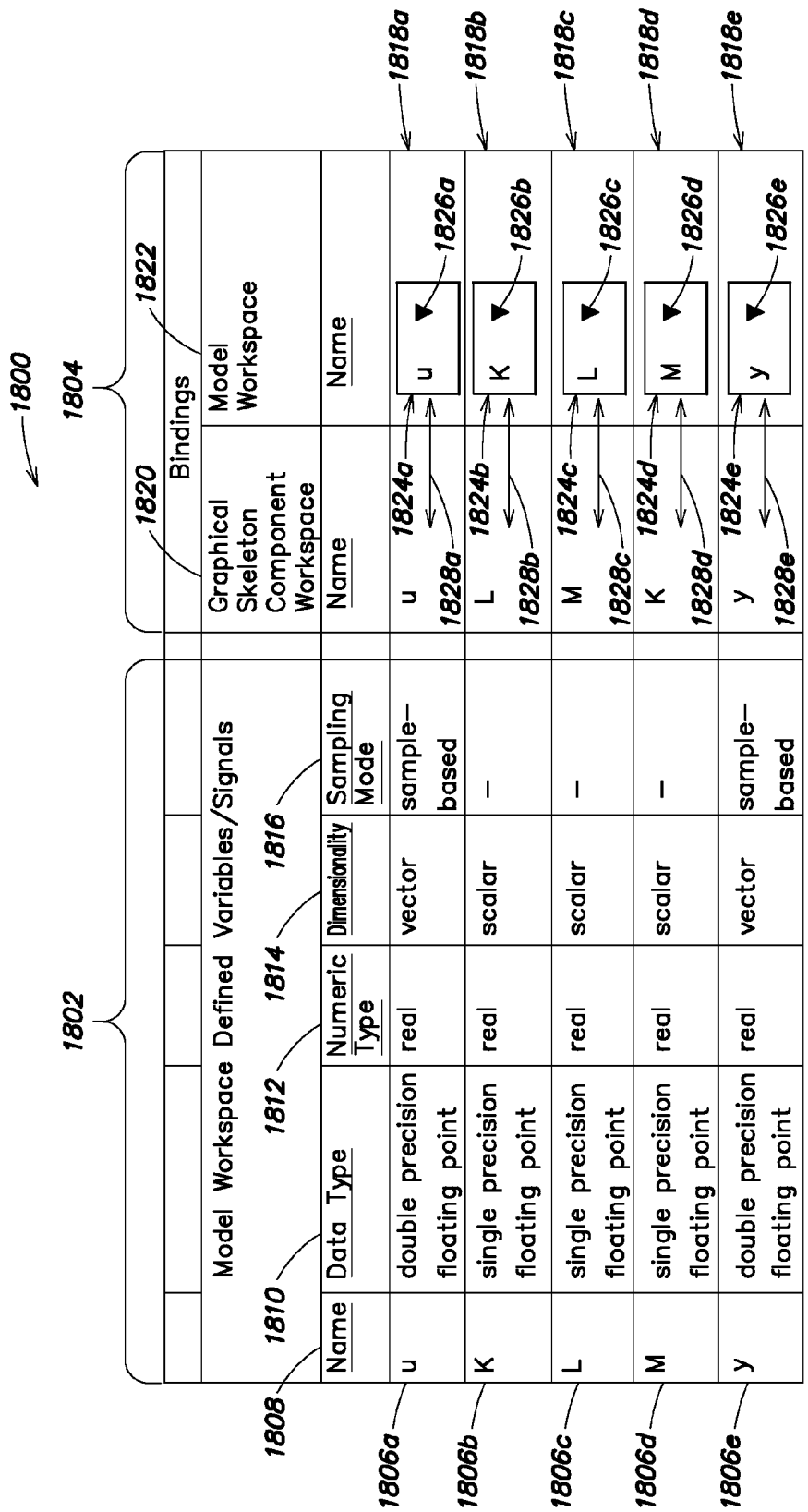
FIG. 18 is a schematic illustration of a bindings dialog in accordance with an embodiment of the invention.

FIG. 18 is a schematic illustration of a bindings dialog 1800 in accordance with an embodiment of the invention. The bindings dialog 1800 may include two sections, such as a Model Workspace section 1802 that presents at least some of the variables defined in the model workspace, and a Bindings section 1804 that sets forth the bindings between variables of the graphical skeleton component and variables of other model portions, such as bindings between variables of the model workspace and variables of the graphical skeleton component's local workspace. The Model Workspace section 1802 may be organized as a table or array having rows and columns whose intersections define cells for storing information or data. In particular, the Model Workspace section 1802 may include a plurality of rows 1806a-e, and each row may correspond to a particular variable defined in the model workspace. Variables may have a plurality of attributes, and the columns of the Model Workspace section 1802 may correspond to at least some of these attributes. For example, the cells corresponding to a first column 1808 may indicate the name of the variables, the cells of a second column 1810 may indicate a data type of the variables, the cells of a third column

1812 may indicate a numeric type of the variables, the cells of a fourth column 1814 may indicate a dimensionality of the variables, and a fifth column 1816 may indicate a sampling mode of the variables. Examples of data types include unsigned 8-bit integer, double-precision floating point, single-precision floating point, and fixed point. Examples of numeric type include real or complex. Examples of dimensionality include one-dimensional, e.g., scalars and vectors, two-dimensional, e.g., arrays, or multidimensional, e.g., multi-dimensioned matrices. Examples of sampling modes include sample-based, in which a signal has one data sample, and frame-based, in which a signal includes a batch of data samples. The simulation engine 208 may analyze the model, extract the variable information and provide it to the UI engine 202 for presentation in the Model Workspace section 1802 of the bindings dialog 1800.

The Bindings section 1804 also may be organized as a table or array having rows and columns whose intersections define cells for storing information or data. In particular, the Bindings section 1804 may include a plurality of rows 1818a-e, and each row may be used to specify a binding between a variable defined, for example, in the local, logical workspace of the graphical skeleton component, and a variable defined in the model workspace, or in another workspace. More specifically, the Bindings section 1804 may include a first column 1820 whose cells indicate the names of variables defined in the local, logical workspace for the graphical skeleton component. The template component system 210 may analyze the graphical skeleton component and the one or more functions defined by the user to complete the graphical skeleton component to extract the names of local variables for the first column 1820.

The Bindings section 1804 also may include a second column 1822 for use in specifying the model workspace variables to be bound, e.g., mapped, to respective variables of the local, logical workspace of the graphical skeleton component. For example, the cells of the second column 1822 may include data entry boxes, such as data entry boxes 1824a-e, for receiving user selections. To bind a variable of the graphical skeleton component to a model workspace variable, the user may enter the name of the model workspace variable in the data entry box 1824 of the row 1818 for the respective variable of the graphical skeleton component. The data entry boxes 1824 may include drop down command buttons, such as drop down arrows 1826a-e, that, if selected, cause the UI engine 202 to present, e.g., in a pop up box or window, a list of the model workspace variables that may be selected for assignment to the respective variable of the graphical skeleton component. The list of model workspace variables presented in the pop up box may be obtained from the Model Workspace section 1802. As illustrated, the user mapped graphical skeleton component variables 'u', 'K', 'L', 'M' and 'y' to model workspace variables 'u', 'L', 'M', "K', and 'y', respectively. The template component system 210 may examine the variable names entered by the user in the data entry boxes 1824, establish corresponding bindings, as illustrated by arrows 1828a-e, and store the bindings in one or more of the bindings data structures 600.

It should be understood that the Bindings dialog 1800 is meant for illustrative purposes, and that other graphical affordances may be used. For example, the Model Workspace section 1802 may be omitted, one or more of the attribute columns may be omitted, additional information, such as variable attributes, may be provided in the Bindings section 1804, etc.

Figure 11:
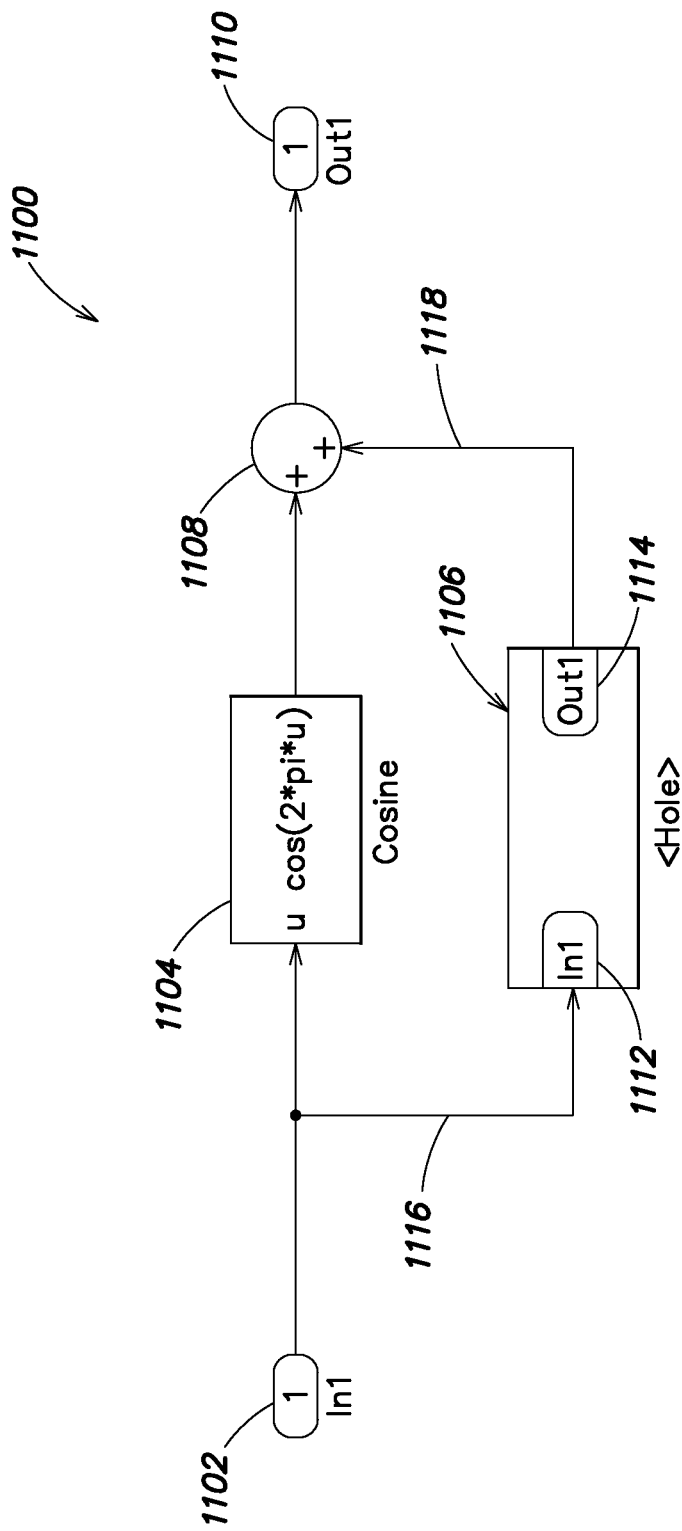
FIG. 11 is a schematic illustration of a graphical skeleton component in accordance with an embodiment of the present invention.

FIG. 11 is a schematic illustration of a graphical skeleton component 1100 in accordance with an embodiment of the invention. The component 1100 may conform, at least in part, to a block diagram modeling environment, such as the Simulink time-based modeling environment from The MathWorks, Inc., the LabVIEW dataflow modeling environment from National Instruments Corp., etc. The component 1100, which may be created by a designer in the modeling environment, may include an Inport block (In1) 1102, an embedded function block (Cosine) 1104, a graphical hole element 1106 (<Hole>), an Add block 1108, and an Outport block (Out1) 1110. The embedded function block 1104 may be configured to perform a function, e.g., cos(2*pi*u), on an input signal 'u'. The graphical hole element 1106 is configured to receive an input signal (In1) at an input port 1112, and to produce an output signal (Out1) at an output port 1114. Furthermore, the graphical hole element's input port 1112 is connected, e.g., "wired", to the Inport block 1102, and the output port 1114 is connected to an input of the Add block 1108, as indicated by first and second arrows 1116, 1118. The graphical hole element 1106 does not include any functionality as this point, but instead represents a placeholder for such functionality when the graphical hole element is subsequently added to a model and completed, e.g., by a user.

Figure 12:
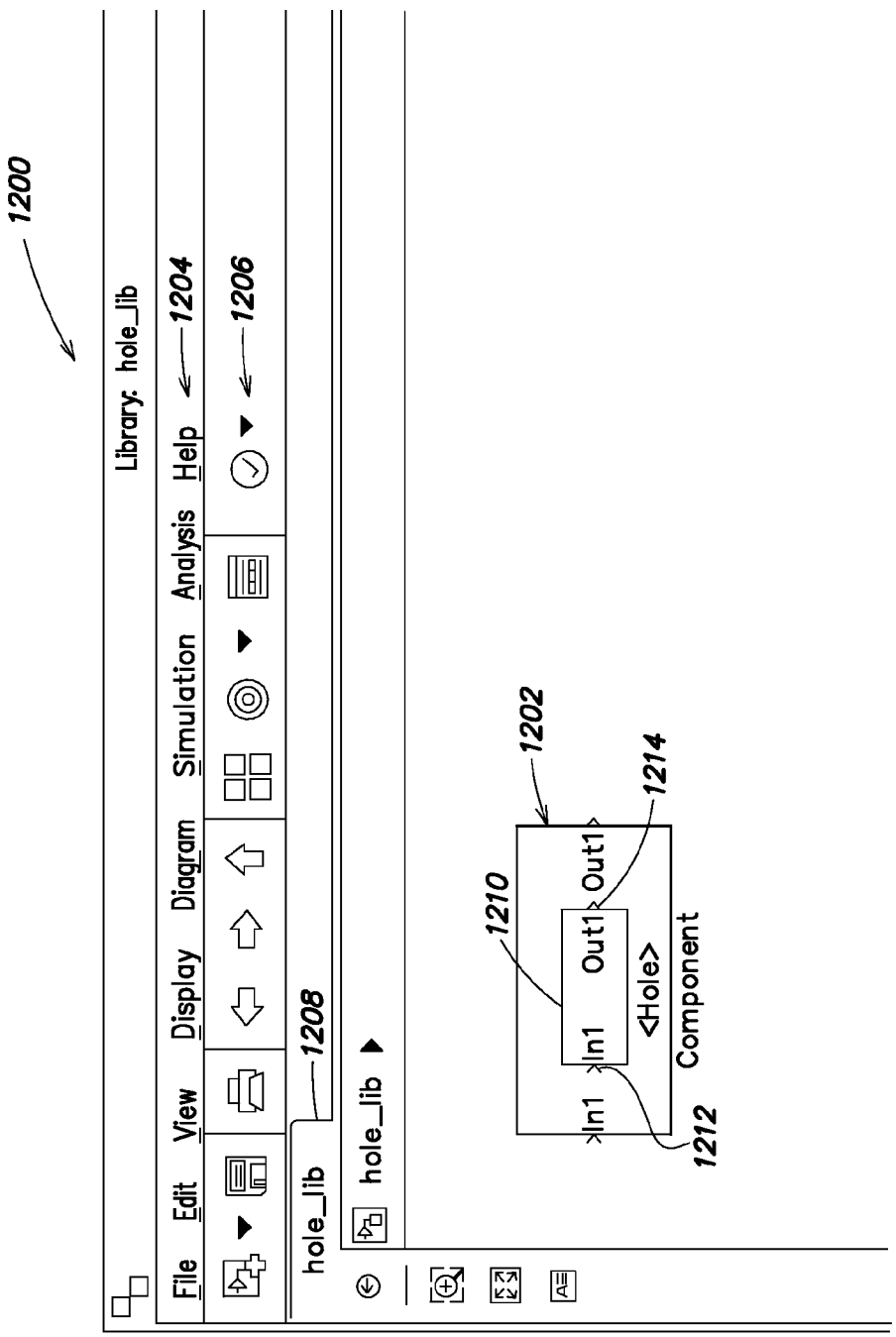
FIG. 12 is a partial, schematic illustration of a library of a modeling environment containing a component subsystem in accordance with an embodiment of the present invention.

Upon completion, e.g., by the designer, the graphical skeleton component 1100 may be saved, for example it may be saved to a library of a modeling environment. FIG. 12 is a partial schematic illustration of a library 1200 of a modeling environment containing a component subsystem (Component) 1202 corresponding to the graphical skeleton component 1100. The library 1200 may include a menu bar 1204 containing a plurality of command menus, e.g., File, Edit, View, etc., and a toolbar 1206 containing a plurality of command buttons. As indicated by tab 1208, the library 1200 may be named "hole_lib". The hole_lib library contains the one graphical component subsystem 1202. The component subsystem 1202 may include one or more graphical features or depictions to indicate, e.g., to a user, that the component subsystem 1202 includes a hole element. For example, the component subsystem 1202 may include an icon, such as a hole subsystem block 1210 (<HOLE>). The hole subsystem block 1210 may include one input port 1212 and one output port 1214 to indicate that the graphical hole element 1106 of the hole subsystem block 1210 has one input and one output. If the component subsystem 1202 includes more than one hole element, it may have more than one icon indicating the presence of multiple hole elements.

Once saved in the hole_lib library 1200, the component subsystem 1202 may be selected and instances of the component added to a model being created, e.g., by a user operating the modeling environment 200.

Figure 13:
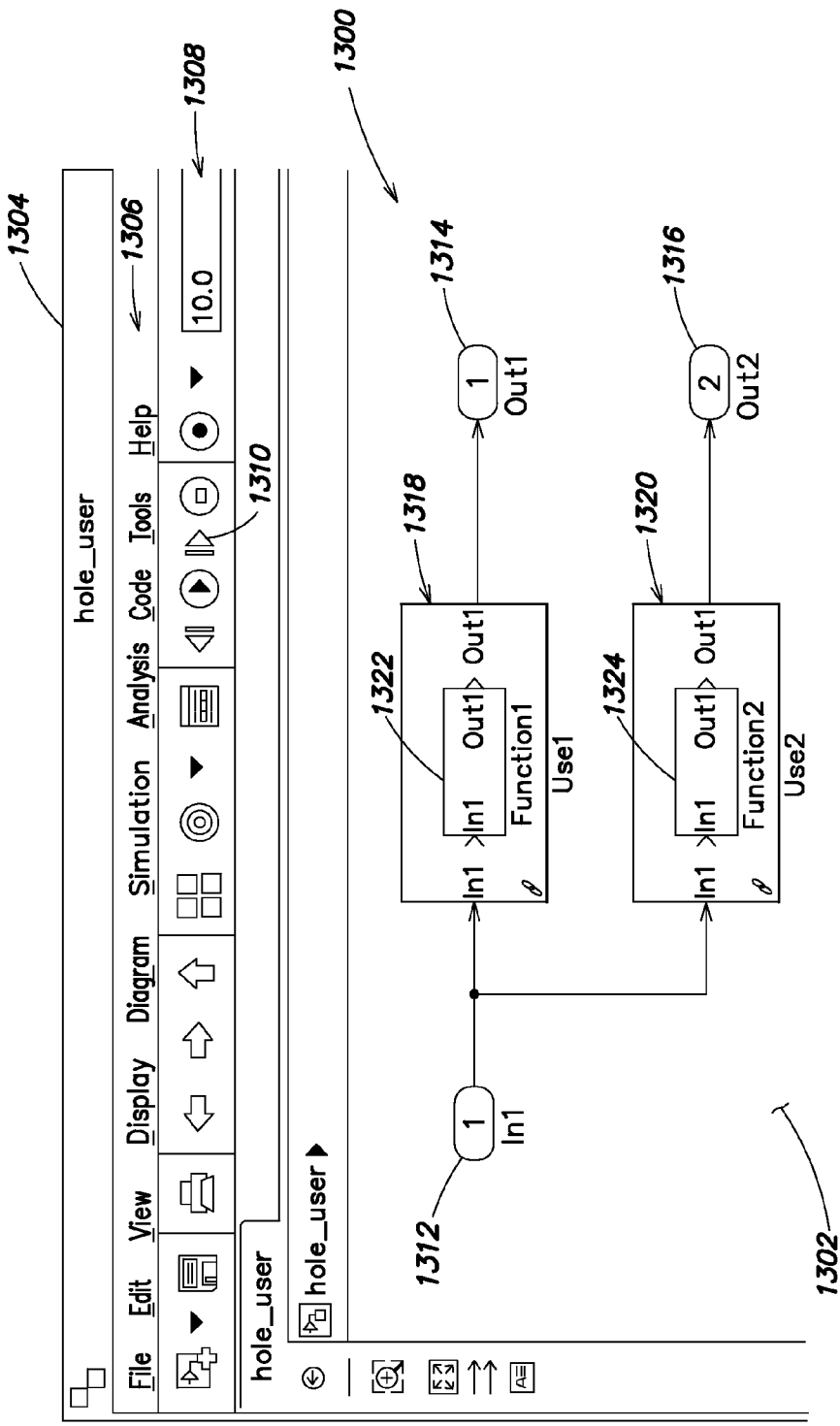
FIG. 13 is a schematic illustration of a graphical model with instances of graphical skeleton components in accordance with an embodiment of the present invention.

FIG. 13 is a schematic illustration of a computer-generated graphical model 1300 having executable semantics. The model 1300, which may be named 'hole_user", may be constructed on a model canvas 1302 of a model editor 1304, which may be part of a Graphical User Interface (GUI). In addition to the canvas 1302, the model editor 1304 may include a menu bar 1306, and a toolbar 1308, among other graphical elements. The toolbar 1308 may include a plurality of command buttons, including a Run/Pause button 1310, among others. In response to a user selecting the Run/Pause button 1310, the simulation engine 208 may execute the model 1300.

The model 1300, which may comply with the Simulink modeling environment, may represent a physical system, such as a controller to be implemented in an embedded system. The model 1300 may include an Inport block (In1) 1312, a first Outport block (Out1) 1314 and a second Outport block (Out2) 1316. The model 1300 also may include two instances of the graphical component subsystem 1202. In particular, the model 1300 may include a first instance (Use1) 1318 and a second instance (Use2) 1320. Each instance 1318, 1320 includes an icon representing a respective hole element, e.g., hole subsystem blocks (Function1) 1322 and (Function2) 1324. The user constructing the model 1300 may specify different functions for the hole elements of the two instances 1318, 1320 of the component.

Figure 14:
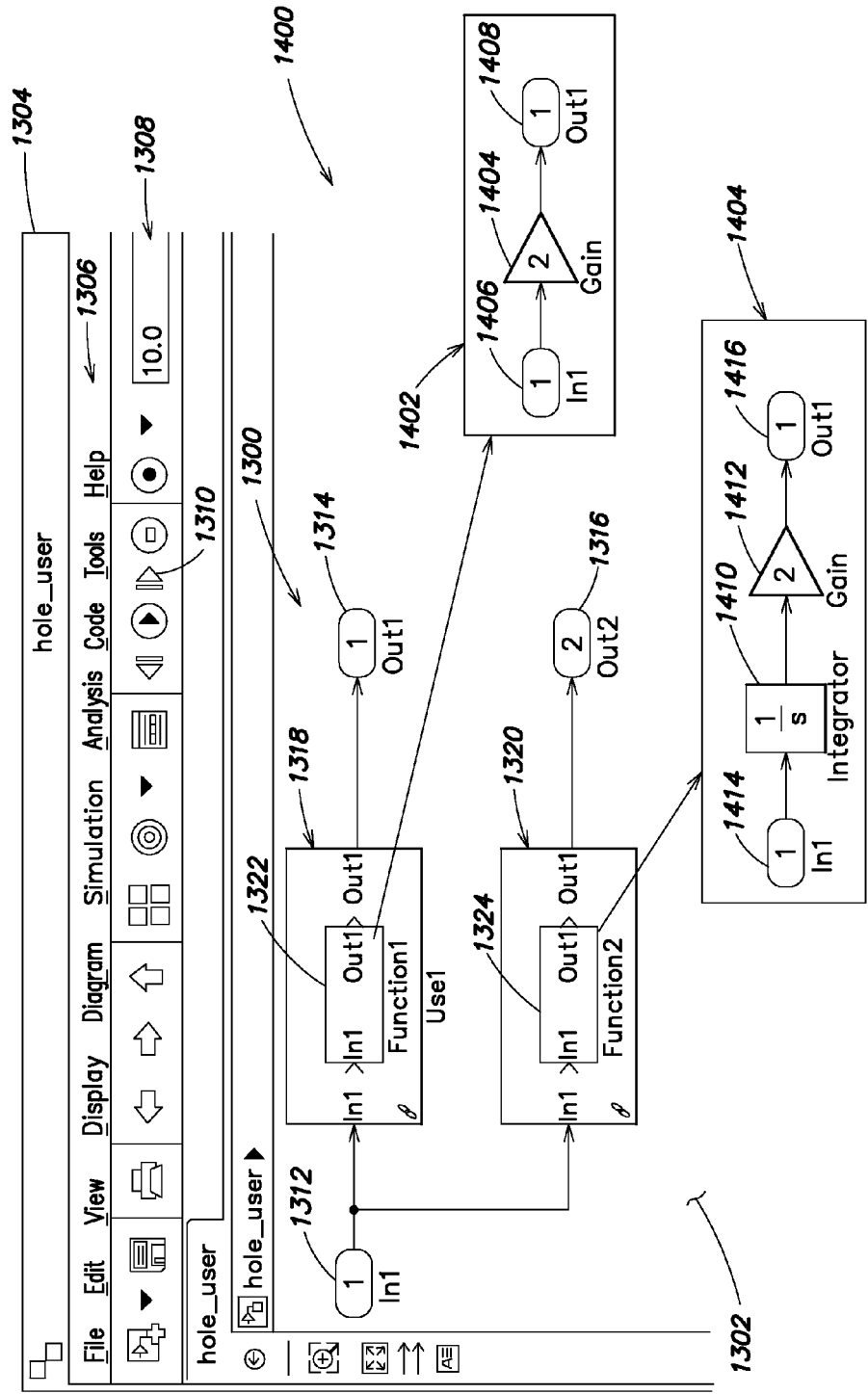
FIG. 14 a schematic illustration of the model of FIG. 13 showing the graphical skeleton components completed.

FIG. 14 is a schematic illustration of the model 1300 illustrating the different functions that may be specified for the graphical hole elements of the two instances 1318, 1320. For example, for the first instance (Use1) 1318, a first set of graphical objects 1402 may be selected and arranged to provide the functionality for the respective graphical hole element 1106, while for the second instance (Use2) 1320, a second set of graphical objects 1404 may be selected and arranged to provide the functionality for the respective hole element 1106. In this manner, the two instances 1318, 1320 may be completed. More specifically, for the first instance 1318, the first set of graphical objects 1402, which are specified for the graphical hole element 1106, may include a Gain block 1404 with a gain of '2'. The Gain block 1404 may be arranged between an Inport block (In1) 1406 and an Outport block (Out1) 1408 that correspond to the input and output ports 1112, 1114 of the graphical hole element 1106 of the first instance 1318. For the second instance 1320, the second set of graphical objects 1404, which are specified for the graphical hole element 1106, may include an Integrator block 1410 connected to a Gain block 1412. The Integrator block 1410 and the Gain block 1412 may be arranged between an Inport block (In1) 1414 and an Outport block (Out1) 1416 that correspond to the input and output ports 1112, 1114 of the graphical hole element 1106 of the second instance 1320.

Figure 15:
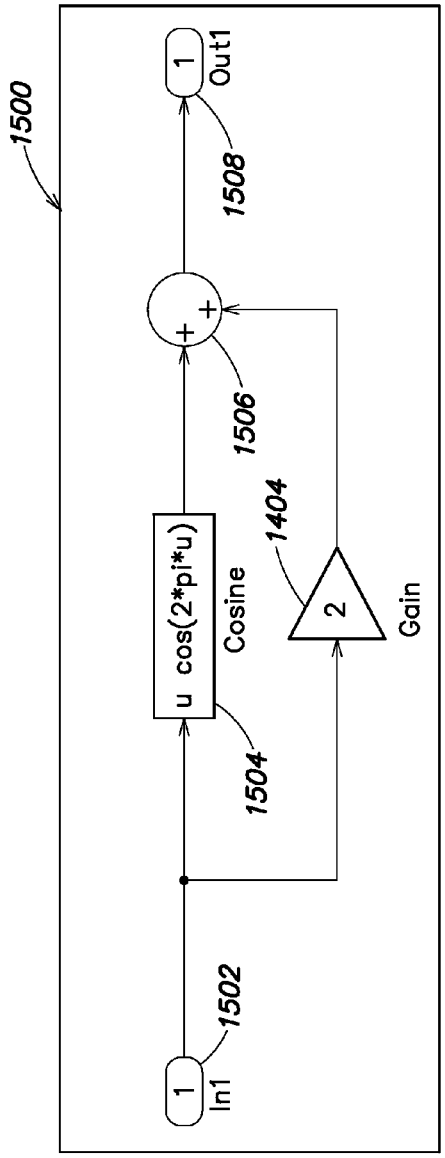
FIG. 15 is a schematic illustration of a completed version of the graphical skeleton component of FIG. 11 in accordance with an embodiment of the present invention.

FIG. 15 is a schematic illustration of a completed version 1500 of the graphical skeleton component 1100 corresponding to the first instance 1318. Like the graphical skeleton component 1100, the completed version 1500 includes an Inport block (In1) 1502, an embedded function block (Cosine) 1504, an Add block 1506, and an Outport block (Out1) 1508. For the completed version 1500, the hole element 1106 is configured with the Gain block 1404, as described herein.

Figure 16:
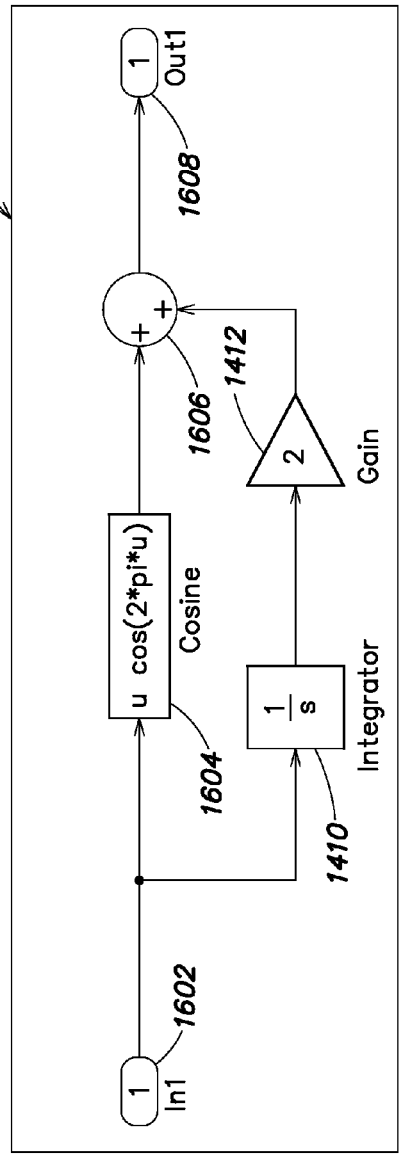
FIG. 16 is a schematic illustration of a completed version of the graphical skeleton component of FIG. 11 in accordance with an embodiment of the present invention.

FIG. 16 is a schematic illustration of a completed version 1600 of the graphical skeleton component 1100 corresponding to the second instance 1318. The completed version 1600 likewise includes an Inport block (In1) 1602, an embedded function block (Cosine) 1604, an Add block 1606, and an Outport block (Out1) 1608. For the completed version 1600, the hole element 1106 is configured with the Integrator block 1410 connected to the Gain block 1412, as described herein.

In an embodiment, the user may add the instances 1318, 1320 of the graphical component subsystem 1202 to the model 1300 by selecting the subsystem 1202 from the hole_lib library, and adding it to the model 1300, e.g., using cut and paste, drag and drop, or other operations. Next, the user may select each instance 1318, 1320 and configure the hole element 1106. For example, the user may replace the hole element 1106 with one or more non-hole graphical objects, such as the Gain and/or Integrator graphical objects, selected from other libraries provided by the modeling environment 200, such as the built-in libraries 216a, 216b.

In an embodiment, a user may select a graphical object, such as a pre-defined block or icon of the modeling environment, a subsystem, a sub-model, a state chart, etc., for example from a library or model, and drag and drop the selected graphical object onto a hole element, such as the hole element 1210 of the graphical skeleton component 1202. The function assignment engine 234 may be configured to replace the hole element 1210 of the graphical skeleton component 1202 with the selected graphical object, in response to such GUI-based operations. In this way, a user may complete a graphical skeleton component using GUI-based operations.

The component conversion engine 236 may generate one or more bindings data structures 600 for the completed components 1500, 1600. For the completed component 1500, the bindings data structures 600 may include one or more pointers to the first set of graphical objects 1402. For the completed component 1600, the bindings data structures 600 may include one or more pointers to the second set of graphical objects 1404. The bindings data structures 600 may also capture bindings among variables of the model 1300, the components 1318, 1320, and the first and second sets of graphical objects 1402, 1404.

A hole element may specify one or more constraints that are to be satisfied by a function specified for the hole element. A hole element may alternatively or additionally specify one or more compatibility rules to be met by a function specified for the hole element.

Referring to FIG. 11, the hole element 1106 of the graphical skeleton component 1100 has at least two constraints. First, the hole element 1106 accepts an single input signal, as indicated by input port 1112. Second, the hole element 1106 produces a single output signal, as indicated by output port 1114. When completing the graphical skeleton component 1100, the set of graphical objects selected for the hole element must satisfy these constraints. As illustrated at FIG. 14, the first set of graphical objects 1402 includes the Gain block 1404, which receives a single input signal and produces a single output signal, as indicated by the Inport and Outport blocks 1406, 1408, thereby satisfying the constraints established by the hole element 1106. Likewise, the second set of graphical objects 1404 includes the Integrator block 1410 connected to the Gain block 1412 such that the second set of graphical objects 1404 receives a single input signal and produces a single output signal, as indicated by the Inport and Outport blocks 1414, 1416, again satisfying the constraints established by the hole element 1106 of the graphical skeleton component.

In an embodiment, the component conversion engine 236 may be configured to determine whether or not a selected graphical object satisfies the one or more constraints of a hole element, and to provide one or more cues, such as visual and/or audible cues, to the user to indicate whether or not the selected graphical object satisfies the one or more constraints. For example, suppose a hole element imposes constraints of a single input and a single output. Suppose further that a user drags a graphical object having two inputs over the hole element. In this case, the component conversion engine 236 may determine that the selected graphical object does not meet the constraints of the hole element, and may provide a visual and/or aural cue to the user that indicates an error or warning. Exemplary visual and aural warning cues include changing the color of the graphical object to red, displaying a popup window with a warning message, causing a warning sound to be played, etc. Similarly, if the user drags a graphical object that meets the constraints over the hole element, the component conversion engine 236 may provide a visual and/or aural cue to the user that indicates the graphical object meets the constraints. Exemplary visual and aural success cues include changing the color of the graphical object to green, causing a success sound to be played, etc.

A graphical skeleton component may include a plurality of hierarchical levels. For example, a graphical skeleton component, which may be at a first hierarchical level, may include one or more subsystems, sub-models, and/or subcharts, which may be at a second hierarchical level. The one or more subsystems, sub-models, and/or subcharts, in turn, may include one or more subsystems, sub-models, and/or subcharts, and so on, defining further hierarchical levels of the component. Additional graphical skeleton components and hole elements, moreover, may be located at any of these hierarchical levels.

In an embodiment, a graphical skeleton component may include one or more mandatory holes and/or one or more permissive holes. A mandatory hole may represent a portion of the graphical skeleton component for which one or more functions must be specified in order for the component to execute. A permissive hole may represent a portion of the graphical skeleton component for which one or more functions may or may not be specified. That is, a permissive hole may include built-in, e.g., default, functionality that allows the component to be executed when included in a model. Nonetheless, one or more user-specified functions may be specified for the permissive hole of a graphical skeleton component, thereby allowing the user to customize the graphical skeleton component.

Illustrative Data Processing System

Figure 17:
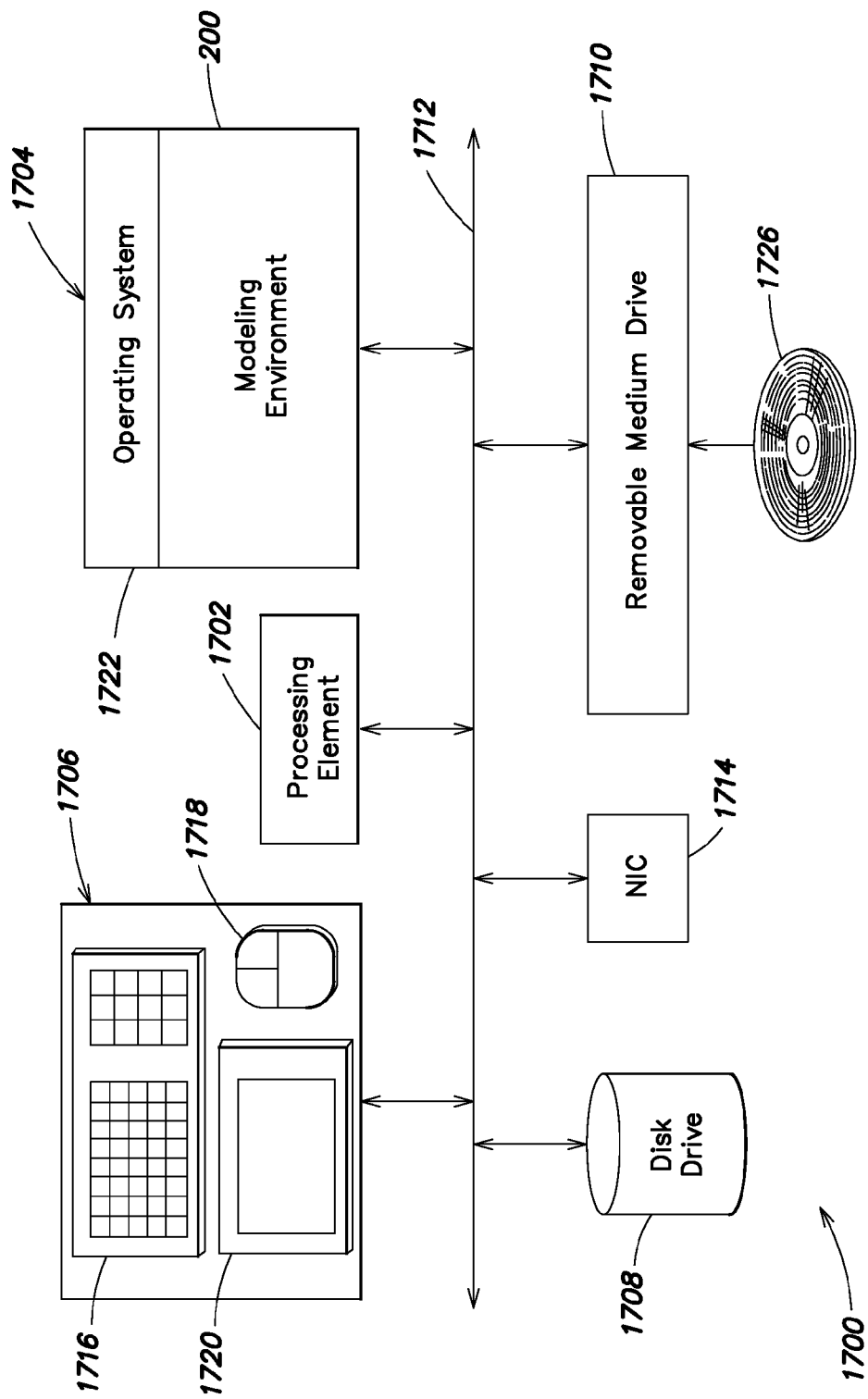
FIG. 17 is a functional block diagram of a data processing system in accordance with an embodiment of the present invention.

FIG. 17 is a schematic illustration of a computer or data processing system 1700 for implementing an embodiment of the invention. The computer system 1700 may include one or more processing elements, such as a processing element 1702, a main memory 1704, user input/output (I/O) 1706, a persistent data storage unit, such as a disk drive 1708, and a removable medium drive 1710 that are interconnected by a system bus 1712. The computer system 1700 may also include a communication unit, such as a network interface card (NIC) 1714. The user I/O 1706 may include a keyboard 1716, a pointing device, such as a mouse 1718, and a display 1720. Other user I/O 1706 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1704, which may be a Random Access Memory (RAM), may store a plurality of program libraries or modules, such as an operating system 1722, and one or more application programs that interface to the operating system 1722, such as the modeling environment 200.

The removable medium drive 1710 may accept and read a computer readable medium 1726, such as a CD, DVD, floppy disk, solid state drive, tape, flash memory or other non-transitory medium. The removable medium drive 1710 may also write to the computer readable medium 1726.

Suitable computer systems include personal computers (PCs), workstations, servers, laptops, tablets, palm computers, smart phones, electronic readers, and other portable computing devices, etc. Nonetheless, those skilled in the art will understand that the computer system 1700 of FIG. 17 is intended for illustrative purposes only, and that the present invention may be used with other computer systems, data processing systems, or computational devices. The present invention may also be used in a networked, e.g., client-server, computer architecture, or a public and/or private cloud computing arrangement. For example, the modeling environment application 102 may be hosted on a server, and accessed by a remote client through an application hosting system, such as the Remote Desktop Connection tool from Microsoft Corp.

Suitable operating systems 1722 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1722 may provide services or functions for other modules, such as allocating memory, organizing data according to a file system, prioritizing requests, etc. The operating system 1722 may run on a virtual machine, which may be provided by the data processing system 1700.

As indicated above, a user or developer, such as an engineer, scientist, programmer, etc., may utilize one or more input devices, such as the keyboard 1716, the mouse 1718, and the display 1720 to operate the modeling environment 200, and construct one or more graphical skeleton components and/or one or more models that include one or more graphical skeleton components. As discussed, the graphical models may be computational and may have executable semantics. In particular, the models may be executable. In particular, the model may provide one or more of time-based, event-based, state-based, frequency-based, control-flow based, and dataflow-based execution semantics. The execution of a model may simulate operation of the system that is being designed or evaluated. The term graphical model, moreover, is intended to include graphical program.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel. Also, the term "user", as used herein, is intended to be broadly interpreted to include, for example, a computer or data processing system (e.g., system 1700) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, in an embodiment, a graphical skeleton component may be constructed using entirely conventional blocks, and one or more of the conventional blocks may be converted to a hole element. In this case, the modeling environment may not include dedicated hole elements. A conventional block may be converted to a hole element, by changing a property value associated with the block. Therefore, it is the object of the appended claims to cover all such variations and modifications as come within the true spirit and scope of the invention.

What is claimed is:

1. A method comprising:
   storing in an electronic library a graphical skeleton component, the electronic library stored in a memory of a computing device, the graphical skeleton component having executable semantics and including
      a plurality of graphical objects,
      one or more computational relationships among the plurality of graphical objects, and
      at least one hole element, the at least one hole element indicating a location in the graphical skeleton component at which an expression is to be evaluated, the expression being unspecified,
   in response to a selection of the graphical skeleton component from the electronic library, creating, by a processor of the computing device coupled to the memory, an instance of the graphical skeleton component in a graphical model;
   converting the instance of the graphical skeleton component in the graphical model to a completed component by assigning a given expression to the at least one hole element of the instance of the graphical skeleton component; and
   at least one of
      executing the completed component within the graphical model, where executing of the completed component includes evaluating the given expression at the indicated location, or
      generating code for the completed component.

2. The method of claim 1 wherein the given expression is
   a function,
   a condition,
   an action,
   a block of code,
   a code snippet,
   a program, or
   a rule.

3. The method of claim 1 wherein the given expression excludes
   a data input,
   a data output, or
   a parameter
   of the graphical skeleton component.

4. The method of claim 1 further comprising:
   establishing a dynamic link between the instance of the graphical skeleton component and the graphical skeleton component stored in the electronic library;
   receiving a change to the graphical skeleton component; and
   propagating the change to the instance of the graphical skeleton component via the dynamic link.

5. The method of claim 1 further comprising:
   storing a pointer to the given expression assigned to the at least one hole element at a bindings data structure.

6. The method of claim 1 wherein the given expression is user-specified.

7. The method of claim 1 further comprising:
   representing the at least one hole element of the graphical skeleton component with a predetermined symbol.

8. The method of claim 1 wherein
   the given expression assigned to the at least one hole element refers to at least one variable defined in the graphical program enclosing the graphical skeleton component.

9. The method of claim 8 wherein
   the at least one variable is a local variable of the graphical model.

10. The method of claim 8 further comprising:
    capturing a binding between the given expression assigned to the at least one hole element of the graphical skeleton component and the at least variable of the graphical model to which the given expression refers.

11. The method of claim 1 wherein the graphical model includes at least one of:
    a time-based block diagram model;
    a dataflow model;
    a control flow model;
    a data/control flow model;
    a state chart; and
    a physics model.

12. The method of claim 1 wherein the one or more computational relationships represent at least one of:
    a mathematical connection,
    a control flow connection,
    a dataflow connection,
    an event-based connection, and
    a physical connection.

13. The method of claim 1 wherein the given expression is specified at least in part graphically.

14. The method of claim 1 wherein the given expression is specified at least in part textually.

15. The method of claim 1 wherein
    the graphical skeleton component has a plurality of hierarchical levels including a top level and a lower level relative to the top level, and
    the at least one hole element is at the lower level.

16. A method comprising:
    storing in an electronic library a graphical skeleton component, the electronic library stored in a memory of a computing device, the graphical skeleton component having executable semantics and including
       a plurality of graphical objects,
       one or more computational relationships among the plurality of graphical objects, and
       at least one hole element, the at least one hole element indicating a location in the graphical skeleton component at which a function is to be received;
    in response to a selection of the graphical skeleton component from the electronic library, creating, by a processor of the computing device, an instance of the graphical skeleton component in a graphical model;
    converting the instance of the graphical skeleton component in the graphical model to a completed component by assigning a given function to the at least one hole element of the instance of the graphical skeleton component; and
    at least one of
       executing the completed component within the graphical model, where executing the completed component includes evaluating the given function at the indicated location, or
       generating code for the completed component.

17. The method of claim 16 wherein
    the given function binds to one or more variables defined in the graphical model, and the one or more variables are not defined in the graphical skeleton component.

18. The method of claim 16 wherein
the at least one hole element specifies one or more constraints to be satisfied by the function to be received, and
the given function satisfies the one or more constraints.

19. The method of claim 17 wherein
the at least one hole element specifies one or more compatibility rules to be met by the function to be received, and
the given function meets the one or more compatibility rules.

20. A method comprising:
storing in an electronic library a graphical skeleton component, the electronic library stored in a memory of a computing device, the graphical skeleton component having executable semantics and including
a plurality of graphical objects,
one or more relationships among the plurality of graphical objects, and
at least one hole element, the at least one hole element designating a place in the graphical skeleton component at which an input expression is to be evaluated, the input expression being unspecified;
in response to a selection of the graphical skeleton component from the electronic library, creating, by a processor of the computing device, an instance of the graphical skeleton component in a graphical model;
converting the instance of the graphical skeleton component in the graphical model to a completed component by assigning a given expression to the at least one hole element of the instance of the graphical skeleton component; and
at least one of
executing the completed component within the graphical model, where executing the completed component includes evaluating the given expression, or
generating code for the completed component.

21. The method of claim 20 wherein the input expression is:
a function,
a condition,
an action, or
a rule.

22. The method of claim 21 wherein the input expression excludes data, a parameter, or a constant.

23. An apparatus comprising:
processing logic coupled to a memory unit,
wherein the processing logic is programmed to:
store in the memory unit a computer-based graphical model having executable semantics,
in response to selection of a graphical skeleton component from a library, construct an instance of the graphical skeleton component in the graphical model, the graphical skeleton component including
a plurality of graphical objects,
one or more computational relationships among the plurality of graphical objects, and
at least one hole element, the at least one hole element indicating a location in the graphical skeleton component at which a function is to be received;
convert the instance of the graphical skeleton component to a completed component by assigning a given function to the at least one hole element; and
at least one of
execute the completed component within the graphical model, where the execution of the completed component includes execution of the given function at the indicated location, or
generate code for the completed component.

24. A non-transitory computer-readable medium comprising program instructions, the program instructions when executed by a processing element operable to:
store in an electronic library a graphical skeleton component, the graphical skeleton component having executable semantics and including
a plurality of graphical objects,
one or more computational relationships among the plurality of graphical objects, and
at least one hole element configured to receive one or more functions, the one or more functions being unspecified;
in response to a selection of the graphical skeleton component from the electronic library, create an instance of the graphical skeleton component in a graphical model;
convert the instance of the graphical skeleton component in the graphical model to a completed component by assigning a given function to the at least one hole element; and
at least one of
execute the graphical model, where the execution of the graphical model includes execution of the given function assigned to the at least one hole element or
generate code for the completed component.

25. A non-transitory computer-readable medium comprising program instructions, the program instructions when executed by a processing element operable to:
store in an electronic library a graphical skeleton component, the electronic library stored in a memory of a computing device, the graphical skeleton component having executable semantics and including
a plurality of graphical objects,
one or more computational relationships among the plurality of graphical objects, and
at least one hole element, the at least one hole element indicating a location in the graphical skeleton component at which a function is to be received;
in response to a selection of the graphical skeleton component from the electronic library, create, by a processor of the computing device, an instance of the graphical skeleton component in a graphical model;
convert the instance of the graphical skeleton component in the graphical model to a completed component by assigning a given function to the at least one hole element of the instance of the graphical skeleton component; and
at least one of
execute the completed component within the graphical model, where executing the completed component includes evaluating the given function at the indicated location, or
generate code for the completed component.

26. A non-transitory computer-readable medium comprising program instructions, the program instructions when executed by a processing element operable to:
store in an electronic library a graphical skeleton component, the electronic library stored in a memory of a computing device, the graphical skeleton component having executable semantics and including
a plurality of graphical objects,
one or more relationships among the plurality of graphical objects, and
at least one hole element, the at least one hole element designating a place in the graphical skeleton component at which an input expression is to be evaluated, the input expression being unspecified;

in response to a selection of the graphical skeleton component from the electronic library, create, by a processor of the computing device, an instance of the graphical skeleton component in a graphical model;

convert the instance of the graphical skeleton component in the graphical model to a completed component by assigning a given expression to the at least one hole element of the instance of the graphical skeleton component; and at least one of execute the completed component within the graphical model, where executing the completed component includes evaluating the given expression.

27. The computer-readable medium of claim 25 further comprising program instructions to:

establish a dynamic link between the instance of the graphical skeleton component and the graphical skeleton component stored in the electronic library;

receive a change to the graphical skeleton component; and propagate the change to the instance of the graphical skeleton component via the dynamic link.

28. The computer-readable medium of claim 25 further comprising program instructions to:

represent the at least one hole element of the graphical skeleton component with a predetermined symbol.

29. The computer-readable medium of claim 25 wherein the one or more computational relationships represent at least one of:

a mathematical connection, a control flow connection, a dataflow connection, an event-based connection, and a physical connection.

30. The computer-readable medium of claim 25 wherein the graphical skeleton component has a plurality of hierarchical levels including a top level and a lower level relative to the top level, and the at least one hole element is at the lower level.

31. The computer-readable medium of claim 25 wherein the at least one hole element specifies one or more constraints to be satisfied by the function to be received, and the given function satisfies the one or more constraints.

32. The computer-readable medium of claim 25 wherein the at least one hole element specifies one or more compatibility rules to be met by the function to be received, and the given function meets the one or more compatibility rules.

* * * * *